United States Patent [19]

Ito et al.

[11] Patent Number: 4,633,405

[45] Date of Patent: Dec. 30, 1986

[54] COPYING MACHINE WITH AUTOMATIC RESETTING CONTROL FEATURES

[75] Inventors: Masazumi Ito, Toyohashi; Yutaka Irie; Yoshikazu Ikenoue, both of Toyokawa; Minoru Nakamura, Toyohashi, all of Japan

[73] Assignee: Minolta Camera Kabushiki Kaisha, Osaka, Japan

[21] Appl. No.: 630,513

[22] Filed: Jul. 13, 1984

[30] Foreign Application Priority Data

Jul. 15, 1983 [JP] Japan ................................ 58-130133

[51] Int. Cl.⁴ .......................... G05B 9/02; G03G 15/00

[52] U.S. Cl. .......................................... 364/184; 355/6; 355/14 R; 355/14 CU; 355/14 C

[58] Field of Search ............... 364/184, 188, 189, 518; 355/14 R, 14 C, 14 CU, 3 R, 6

[56] References Cited

U.S. PATENT DOCUMENTS

| | | | |
|---|---|---|---|
| 3,436,530 | 4/1969 | Faude et al. | 355/14 R |
| 4,247,194 | 1/1981 | Kubota et al. | 355/14 R |
| 4,277,777 | 7/1981 | Schulz | 340/521 |
| 4,394,087 | 7/1983 | Irie et al. | 355/14 E |
| 4,437,756 | 3/1984 | Kawakubo et al. | 355/14 R |
| 4,477,178 | 10/1984 | Furuichi et al. | 355/14 C |
| 4,491,827 | 1/1985 | Serguira et al. | 355/14 CU |
| 4,501,485 | 2/1985 | Tsudaka | 355/14 CU |
| 4,519,088 | 5/1985 | Rodemacher et al. | 377/16 |
| 4,521,847 | 6/1985 | Ziehm et al. | 364/184 |
| 4,572,653 | 2/1986 | Ito et al. | 355/14 R |
| 4,598,994 | 7/1986 | Tomosada et al. | 355/14 R |

FOREIGN PATENT DOCUMENTS

| | | |
|---|---|---|
| 53-108425 | 9/1978 | Japan . |
| 56-164356 | 12/1981 | Japan . |

*Primary Examiner*—Jerry Smith
*Assistant Examiner*—John R. Lastova
*Attorney, Agent, or Firm*—Price, Gess & Ubell

[57] ABSTRACT

There is disclosed a control apparatus for copying machines or the like which have a function of autoresetting operating conditions for the machine to standard conditions upon lapse of a specified period time after the completion of operation of the machine or after a predetermined input procedure and is operable with a key device associated with the machine for permitting the operation of the machine, wherein the control apparatus effects the autoresetting function to immediately reset the operating conditions to the standard conditions when the machine has been brought out of the operation permitted state by the key device, irrespective of lapse of the specified period of time for the autoresetting. When the user withdraws the key device from the machine, the operating conditions change to the standard conditions, thereby efficiently preventing the objection that the machine will subsequently operate under the conditions undesired by the next user.

12 Claims, 35 Drawing Figures

COPYING MACHINE WITH AUTOMATIC RESETTING CONTROL FEATURES

BACKGROUND OF THE INVENTION

1. Field of the Invention

The present invention relates to a control apparatus for copying machines, printers, facsimile systems or like machines having the function of autoresetting operating conditions for the machine to standard conditions upon lapse of a specified period of time after the completion of an operation of the machine or after a predetermined input procedure.

2. Description of the Prior Art

Generally with electrophotographic copying machines, printers, facsimile systems and like machines, the number of copies, copy magnification, copy density, copy paper size (paper feed portion) and like operating conditions for the machine are set before the start of operation of the machine, and the machine is operated in accordance with the set conditions. When the machine is allowed to stand without any manipulation for a specified period of time after the completion of operation of the machine or after these operating conditions are entered through an input device, the operating condition settings are automatically reset to predetermined standard conditions which, in the case of copying machines, include: copy number=1, copy magnification=X1, copy density=standard level, and copy paper size=A4 (or paper feed portion=lower). Machines having such a function (hereinafter referred to as "autoresetting function") have been placed into general use.

For example, U.S. Pat. No. 4,394,087 discloses a copying machine in which an exposure amount or the copy magnification is automatically reset to standard condition upon lapse of a specified period of time after completion of operation of the machine or after an operation for changing the exposure amount or the copy magnification.

Thus, when the user does not operate the machine for a predetermined period of time, this is interpreted as disclosing that the user has no intention to continuously use the machine, so that the operating conditions are automatically reset as stated above. The efflux time for resetting has no particular basis; a suitable period of time, e.g. 30 seconds or 1 minute, is set for a particular machine or is determined by the manufacturer at present. In any case, if the user apparently has no intention to use the machine continuously, the time set for resetting will be of no significance. It is very likely that the next user may operate the machine during the undesired preceding conditions before resetting and become aware that the conditions are not standard after the start of operation.

On the other hand, to meet the necessity, for example, of calculating charges or checking the frequency of use when a single copying machine or the like is used commonly by a plurality of sections or departments, Published Unexamined Japanese Patent Application SHO No. 53-108425, for example, discloses a copying machine or the like which is operatively connectable to a device (hereinafter referred to as a "key device"), such as a key counter, which permits operation of the machine when attached thereto or to a unit for controlling the machine. U.S. Pat. Nos. 3,436,530 and 4,247,194 also disclose the key counter.

Published Unexamined Japanese Patent Application SHO No. 56-164356 discloses a key device which comprises the combination of a magnetic card and an assembly including means for reading data from the magnetic card or writing data to the card, such that the magnetic card permits machine operation when inserted in place.

When a copying machine or the like which has the autoresetting function and is operable with this type of key device is used, the user generally withdraws the key counter or magnetic card upon the completion of machine operation, leaves the location of the machine and returns to the place of his work, so that the next user is very likely to start the machine as it is before autoresetting as described above.

SUMMARY OF THE INVENTION

Accordingly, an essential object of the present invention is to provide an improved control apparatus free from an undesirable likelihood that the next user will operate the machine under the preceding set conditions.

Another object of the present invention is to provide a control apparatus for a copying machine or the like which has an autoresetting function and is operable with the key device, whereby when the machine is brought out of the operable state the autoresetting function is immediately exercised.

In accomplishing these objects according to the present invention, there is provided an improved control apparatus for copying machines or the like having the function of autoresetting operating conditions for the machine to standard conditions upon lapse of a specified period of time after the completion of operation of the machine or after a predetermined input procedure, the apparatus comprising a key device associated with the main body of the machine for permitting the operation of the machine, sensor means for detecting whether the machine operation is permitted by the key device, and control means for effecting the autoresetting function to immediately reset the operating conditions to the standard conditions when the sensor means detects that the machine has been brought out of the operation permitted state by the key device, irrespective of lapse of the specified period of time for the autoresetting. Whereupon, the key device may be a key counter or a magnetic card described above, or furthermore another type of device.

BRIEF DESCRIPTION OF THE DRAWINGS

These and other objects and features of the present invention will become apparent from the following description taken in conjunction with the preferred embodiment thereof with reference to the accompanying drawings, in which.

In the following description, like parts are designated by like reference numbers throughout the several drawings.

DETAILED DESCRIPTION OF THE INVENTION

An embodiment of the present invention will be described below with reference to the drawings.

[Copying Mechanism]

Figure 1:
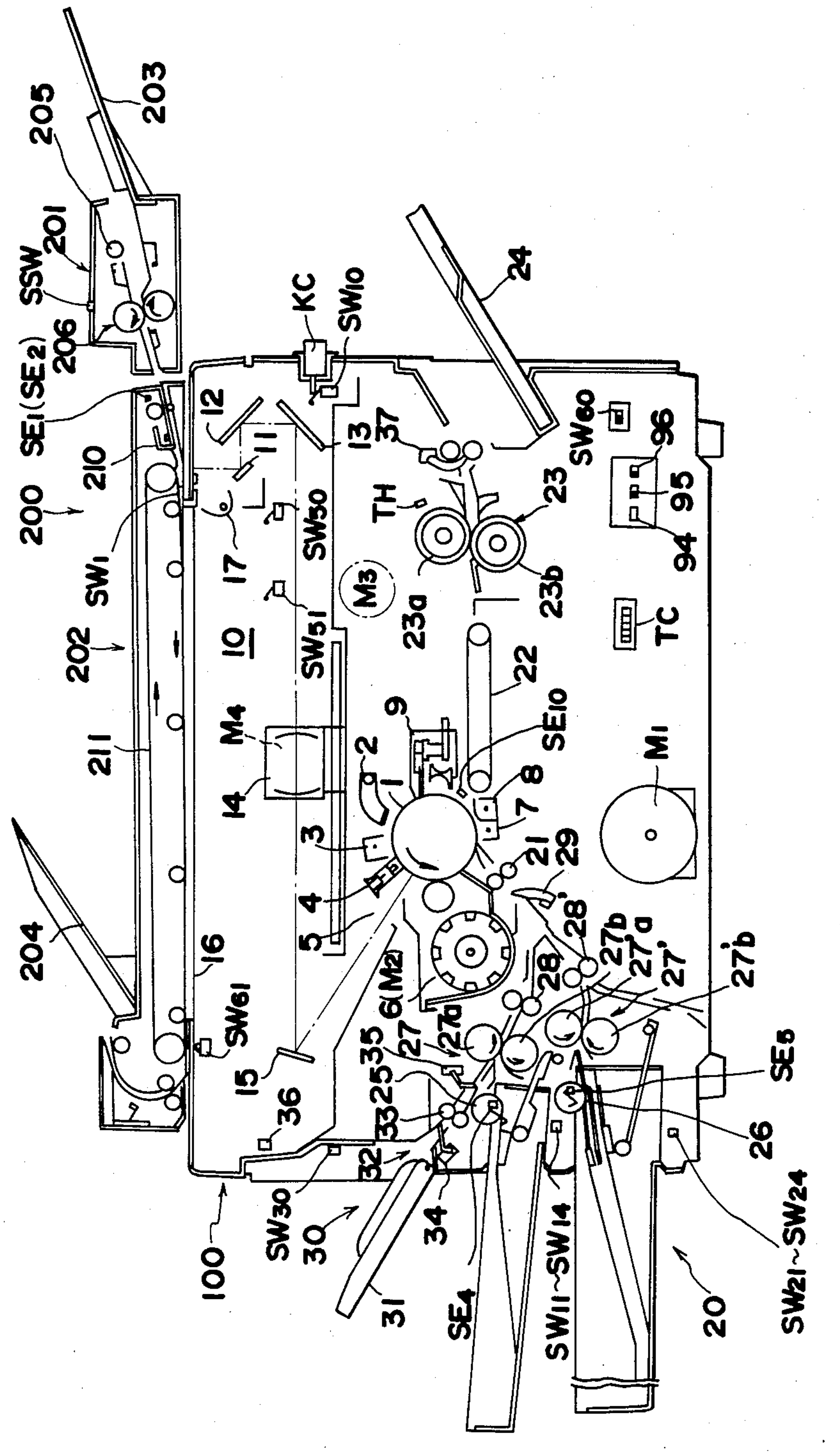
FIG. 1 is a sectional view schematically showing the construction of copying machine having a control apparatus of the present invention.

FIG. 1 is a sectional view schematically showing the construction of a copying machine having a control apparatus of the invention. First, the construction and operation of the copying machine will be described with reference to this drawing.

Approximately in the center of the main body of the copying machine 100, a photoconductive drum 1 is supported which is rotatable counterclockwise in the drawing. Arranged around the drum 1 are an eraser lamp 2, sensitizing charger 3, image end and image interval eraser 4, developing unit 6, transfer charger 7, separating charger 8, cleaner 9, etc. The drum 1 has a photoconductive surface layer, which is uniformly charged by being passed by the eraser lamp 2 and the sensitizing charger 3. When the drum surface is exposed to an optical image by a scanning optical system through a slit portion 5, an electrostatic latent image is formed on the surface. The image end and image interval eraser 4 comprises a plurality of light-emitting diodes (LED's) arranged widthwise of the image for removing undesired charges from the surface of the drum 1 when the image is to be formed. The construction and control of the eraser 4 will be described later in detail.

The optical system 10 is disposed under a document glass plate 16 for scanning the images of documents. The system 10 comprises a light source 17, movable mirrors 11, 12, 13, a lens 14 and a mirror 15. The light source 17 and the movable mirror 11 are so driven as to travel together leftward at a speed of v/m (wherein m is the copying magnification) relative to the pripheral speed v (which is constant independently of variations in magnification) of the drum 1, while the movable mirrors 12 and 13 are driven to travel together leftward at a speed of v/2m. For a change of magnification, the lens 14 is shifted on the optical axis and the mirror 15 is similarly shifted and pivotally moved to correct the optical path. The principle of such a magnification varying mechanism is already known, so that it is herein mentioned merely that the lens 14 and the mirror 15 have their positions controlled in operative relation to each other by a stepping motor M4 according to the magnification data to be stated later, without describing the coupling mechanism, etc. specifically. For the same reason as above, the control system for giving the speed of v/m to the scanning optical system will not be described in detail except that a d.c. motor M3 is controlled to rotate at varying speeds in accordance with the magnification data.

Copy paper is fed to the interior of the machine by an automatic paper feeder 20 having upper and lower two cassette loading portions and provided at the left side of the main body of the machine 100 shown or by a manual paper feeder 30. The paper is temporarily stopped by a timing roller 21 and thereafter sent to the transfer station in timed relation with the image formed on the drum 1. The image now in the form of a toner image is transferred to the paper by the transfer charger 7, whereupon the paper is separated from the surface of the drum 1 by the separating charger 8 and fed to a fixing unit 23 by a conveyor belt 22. The image is fixed to the paper, which is then discharged onto a tray 24. A key counter KC operates upon feed of the paper to add "1", and a total counter TC operates upon discharge of the paper to add "1" to each count of copying cycles.

After the image transfer, the toner and charges remaining on the drum 1 are removed by the cleaner 9 and the eraser 2 to make the drum ready for the next coying cycle.

One of the automatic paper feeder 20 and the manual paper feeder 30 is selectively used. For the selection, a manual feed table 31 is adapted to cover a manual feed inlet 32 when closed or to open the inlet 32 and serve as a guide for the paper to be manually fed when opened. The opening or closing of the table 31 is detected by a sensor 36. When insertion of paper is detected by a paper insertion sensor 34 with the table 31 in its open position, the machine is set in manual feed copying mode. The machine is set in automatic feed copying mode in response to a signal indicating closing of the manual feed table 31 or selection of automatic paper feed or manipulation of numerical keys for setting the number of copies as will be described later. The mode setting control process will be described later in detail.

In the case of automatic paper feed, a print key PSW (see FIG. 3) for initiating the copying machine 100 into copying operation is manipulated to start the image forming system including the drum 1 for the drum 1 to complete a preliminary drive, whereupon a feed roller 25 or 26 is driven. In response to a scan start signal which is produced with the feed of copy paper, the scanning optical system 10 is initiated into travel, permitting the transport of copy paper in synchronism with an image forming operation. Two or three sheets of copy paper are pushed forward by the feed roller 25 or 26, and the uppermost sheet only is further forwarded by separating means 27 or 27′ in the next position.

The separating means 27 or 27′ comprises an upper roller 27*a* or 27′*a* which is driven in the paper transport direction and a lower roller 27*b* or 27′*b* which is driven in the reverse direction as illustrated. The underlying sheets other than the uppermost sheet which are pushed forward along with the uppermost by the feed roller are pushed back by the lower roller 27*b* or 27′*b*, permitting the uppermost sheet only to advance toward an intermediate roller 28 or 28′ in the next position. As will be described later, the intermediate roller 28 or 28′ has its rotation controlled in connection with the timing roller 21 in the next position.

In the case of manual paper feed, the paper inserted into the inlet 32 is detected by the sensor 34, whereupon a manual feed roller 33 rotates to send the paper into the machine. Simultaneously with this or with some time delay, the drum 1 is started as when the print key is manipulated as stated above. The manually inserted paper is temporarily held in a standby position where a paper leading end sensor switch 35 is disposed. After a preliminary drive step including rotation of the drum 1 has been completed, the feed roller 33 resumes its rotation to send the paper further into the machine.

As will be described later, the manual feed table 31 is removably attached to the main body of the copying machine 100. The table 31 is replaceable by a universal paper feed unit having a feed motor, feed roller, etc. incorporated therein. When equipped with this unit, the machine is equivalent to one having a three-stage automatic paper feeder.

The cassette loading portions of the automatic paper feeder 20 are provided with size sensor switches SW11 to SW14 and SW21 to SW24. The cassette to be used has projections or magnets (not shown) in a specified arrangement to actuate some of the switches in a particular mode to identify the size of paper loaded in terms of a 4-bit binary code. Various mechanisms are already known for discriminating copy paper sizes with use of the cassettes containing copy paper, so that such a mechanism will not be described in detail.

The copying machine 100 is further provided with an automatic document feeder (hereinafter referred to as "ADF") 200 for conducting copying operation in operative relation therewith. When a switch SW1 detects that the ADF 200 has been installed in place and electrically connected to the main body of the machine 100, the ADF 200 and the copying machine 100 are controlled in connection with each other, and the operation mode of the machine 100 is changed to ADF mode. The ADF mode is such that when a copying start key SSW on the ADF 200 is depressed, the ADF 200 starts its operation with the machine 100 held in its standby state to transport a document from a document tray 203 to a specified position on the upper surface of the document glass plate of the machine 100, whereupon the document is stopped while the ADF 200 feeds a start signal to the machine 100 to start the foregoing copying operation. When the last scanning movement for the document is completed, the copying machine 100 gives an operation signal to the ADF 200, which in turn discharges the document onto a discharge tray 204. Another document, if present on the document tray 203, is transported to the specified position with the discharge of the preceding document.

The ADF 200 consists primarily of a document delivery unit (A unit) 201 for stocking documents and sending out the documents one by one, and a document feed unit (DF unit) 202 for transporting the received document between the unit 202 and the upper surface of the document glass plate, stopping the document in the specified position on the glass plate and transferring the document from the position onto the discharge tray 204. The DF unit 202 is singularly usable also as a document feeder for transporting manually inserted documents. Furthermore, the DF unit 202 as attached to the upper side of the copying machine 100 is openable relative to the main body of the machine 100 to expose the document glass plate. Thus the unit 202 can be used in the same manner as a usual document cover.

Figure 2:
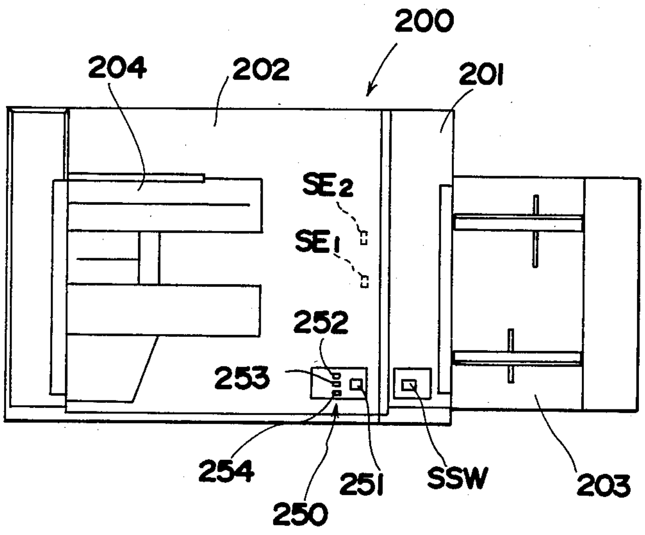
FIG. 2 is a plan view of an automatic document feeder operatively connected to the copying machine.

The ADF 200 further has an operating portion and sensors as shown in FIG. 2 which is a plan view showing the ADF 200. The operating portion 250, which is provided on the upper side of the DF unit 202, has a mode setting key 251 and mode indicating lamps 252, 253 and 254. These lamps 252, 253 and 254 are turned on one after another every time the mode setting key 251 is depressed, and the control mode is changed to "automatic paper selection", "automatic magnification selection" and "manual", respectively.

The "automatic paper selection" mode uses a fixed copy magnification and follows the procedure of determining the optimum size of copy paper from the magnification and the size of the document inserted to automatically select the paper feed portion concerned and feeding copy paper from the selected feed portion.

The "automatic magnification selection" mode uses copy paper of fixed size to calculate a proper copy magnification from the copy paper size and the size of the document inserted and automatically set the magnification by the magnification setting mechanism to be described later.

Disposed in the vicinity of the document inlet of the DF unit 202 are a document length sensor SE1 which is so positioned as to detect the document inserted irrespective of the size or orientation of the document, and a document width sensor SE2 which assumes one of the two states of detection and non-detection in accordance with the width of the document. The size and orientation of the document are discriminated based on the signals from the two sensors.

While various methods of discriminating the sizes of paper are proposed, the embodiment uses a method of recognizing the sizes and orientations of documents from two signals, i.e. by detecting the document being transported by the length sensor SE1 to measure the duration of detection and checking whether the document is detected by the width sensor SE2. Although almost all sizes of documents can be discriminated only from length signals by this method insofar as the sizes are regular, the paper sizes of A series and B series domestically adopted involve the likelihood that sheets of different sizes will be detected with identical length signals depending on horizontal or vertical orientation of the sheets. Accordingly the width sensor SE2 is provided for discriminating such sheets.

The copying machine 100 of the foregoing construction has the operating and control systems to be described below and is controlled in accordance with the states of various sensors and input switches.

[Operating and Control Systems]

Figure 3:
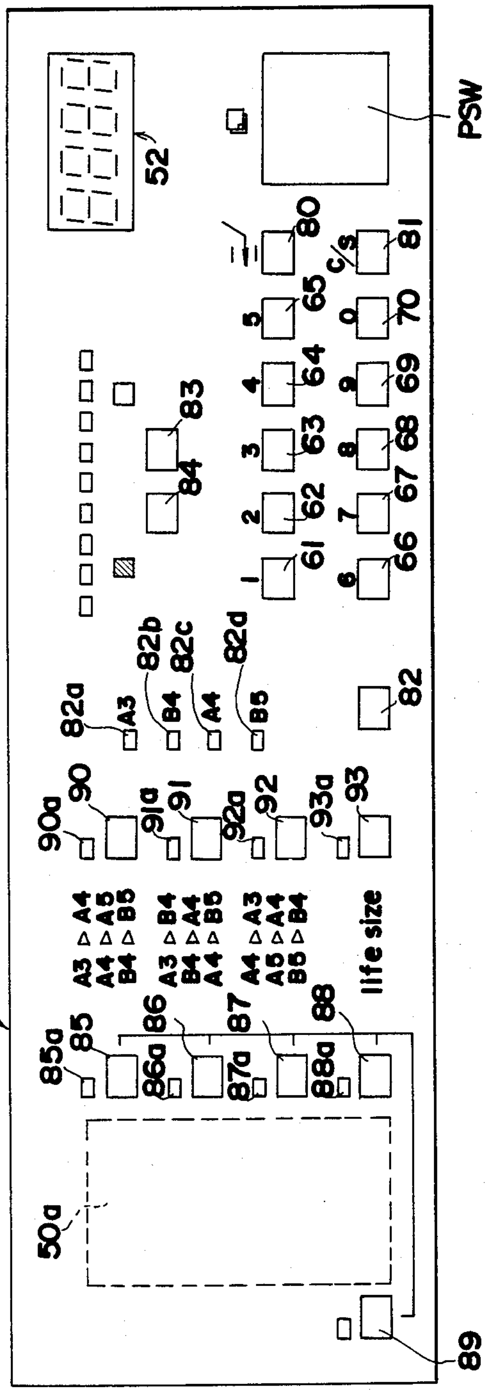
FIG. 3 is a plan view of an operating panel of the copying machine.

FIG. 3 shows the arrangement of operating keys on the operation panel 50 of the copying machine. The panel 50 has the above-mentioned print key PSW for starting copying operation, a numerical display 52 for showing 4-digit numerical values, ten numerical keys 61 t0 70 corresponding to the numerical values of "1", "2", . . . , "9", and "0", respectively, an interrupt key 80 for specifying interrupt copying, a clear/stop key 81, paper selection keys 82 for selecting one of different kinds of copy papers loaded in a plurality of stages by specifying the desired size, up and down keys 83 and 84 for varying the copy image density stepwise and specifying the desired density, groups of keys 85 to 93 for copy magnification setting means, etc. Each of the keys is provided with a switch which usually holds the circuit concerned open. In the circuit diagrams to be described later, a particular switch will be referred to by the reference numeral assigned to the corresponding key.

The magnification setting keys 85, 86, 87 and 88 of the first group are provided for setting a desired magnification. When one of these keys is depressed after the control mode of the copying machine has been changed to a first magnification setting mode by a first magnification setting mode change key 89, the numerical value entered by one or some of the numerical keys and shown on the display 52 is stored as a copy magnification in a memory corresponding to the depressed key.

The magnification setting keys 90, 91, 92 and 93 of the second group have corresponding memories having predetermined copy magnifications stored therein individually such that a copying operation can be conducted at a preset value without the necessity of using the first key group for numerical setting. Accordingly the copy magnifications preset are those which are thought to be frequently used usually by a particular customer and which are selected before the machine is delivered from the factory. This will be explained later.

Thus, the two groups of keys serve different functions; the first is manipulated for the user to set the desired copy magnification, while the second is used for selecting a magnification which is generally used, for example, one corresponding to A4→B5, B4→A4, A3→A4 or A4→A3 according to the specifications in Japan. However, since the numerical values preset for the second key group are general or calculated copy magnifications, it is likely that the magnification of the copies actually obtained will be slightly different from the specified one owing to an error involved in the machine or design. For instance, even if the life-size magnification (X1) is selected, the actual magnification can be X1.004 or X0.996. In such a case, a second magnification setting mode change key 94 shown in FIG. 4 is depressed to change the control mode of the copying machine to a second magnification setting mode, and the same procedure as in the first magnification setting mode is followed to set the desired numerical value in a memory corresponding to the specified one of the keys 90 to 93 to obtain the desired magnification.

The switches corresponding to these input keys, and various sensors on the machine 100 and the ADF 200 are associated with a control apparatus 300 including microprocessors.

Figure 4:
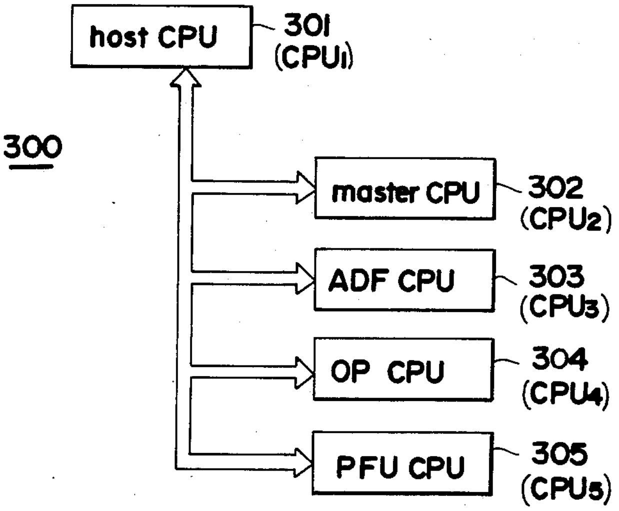
FIG. 4 is a diagram showing the relationship between CPU's included in a microcomputer system for controlling the copying machine.

FIG. 4 shows the relationship between microprocessors (hereinafter referred to simply as "CPU's") 301 to 305 included in the control apparatus 300. Indicated at 301 is a host CPU which performs a central role for control. As will be apparent from the input-output relationship shown in FIGS. 6 to 9, the host CPU 301 has a serial output terminal Sout connected to serial input terminals Sin of slave CPU's 302 to 305, a serial input terminal Sin connected to serial output terminals Sout of the slave CPU's 302 to 305, an interrupt request terminal INTreq connected to interrupt terminals INT of the slave CPU's, and a clock output terminal CLKout connected to clock input terminals CLKin of the slave CPU's. When the terminal INTreq of the host CPU 301 becomes "H" at a predetermined cycle, data blocks containing the data to be transferred to the slave CPU's 302 to 305 are sent out from the serial output terminal Sout of the host CPU to a bus line with clock signals in timed relation with the cycle. Each of the slave CPU's fetches the data through the serial input terminal Sin with the timing of "H" assigned thereto, while the slave SPU delivers data through its serial output terminal in response to a clock signal. When the terminal INTreq of the host CPU 301 is "L", the slave CPU's 302 to 305 perform calculation with the fetched data, write new data to a register or the like when required, and wait until the terminal INTreq of the host CPU 301 becomes "H".

Figure 5:
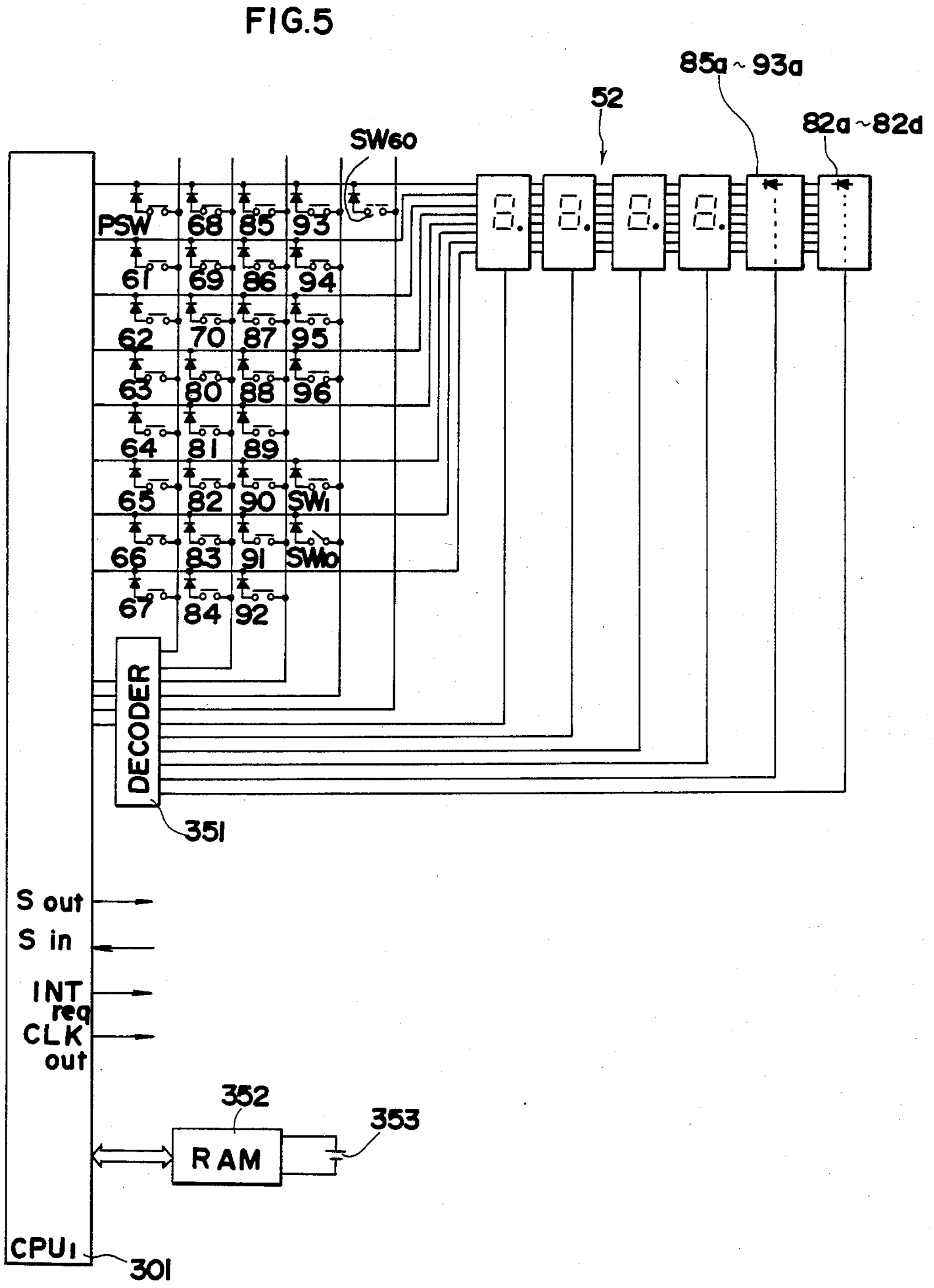
FIG. 5 to FIG. 9 are circuit diagrams showing the input-output relationship between the CPU's.

FIG. 5 shows the electrical input-output relationship between the host CPU 301 and the copying mechanism, etc. The host CPU 301 is provided within the main body of the copying machine 100 and is chiefly connected to the groups of keys and the display 52 on the operation panel 50 through a decoder 351 for checking key inputs and controlling the display outputs of numerical values and the light-emitting diodes. The host CPU further checks the installed state of the aforementioned key counter KC with reference to the input from a sensor switch SW10. Indicated at 352 is a RAM backed-up by a battery 353 for retaining variable data, such as set magnification data, which is to be retained after the power supply is turned off.

Figure 6:
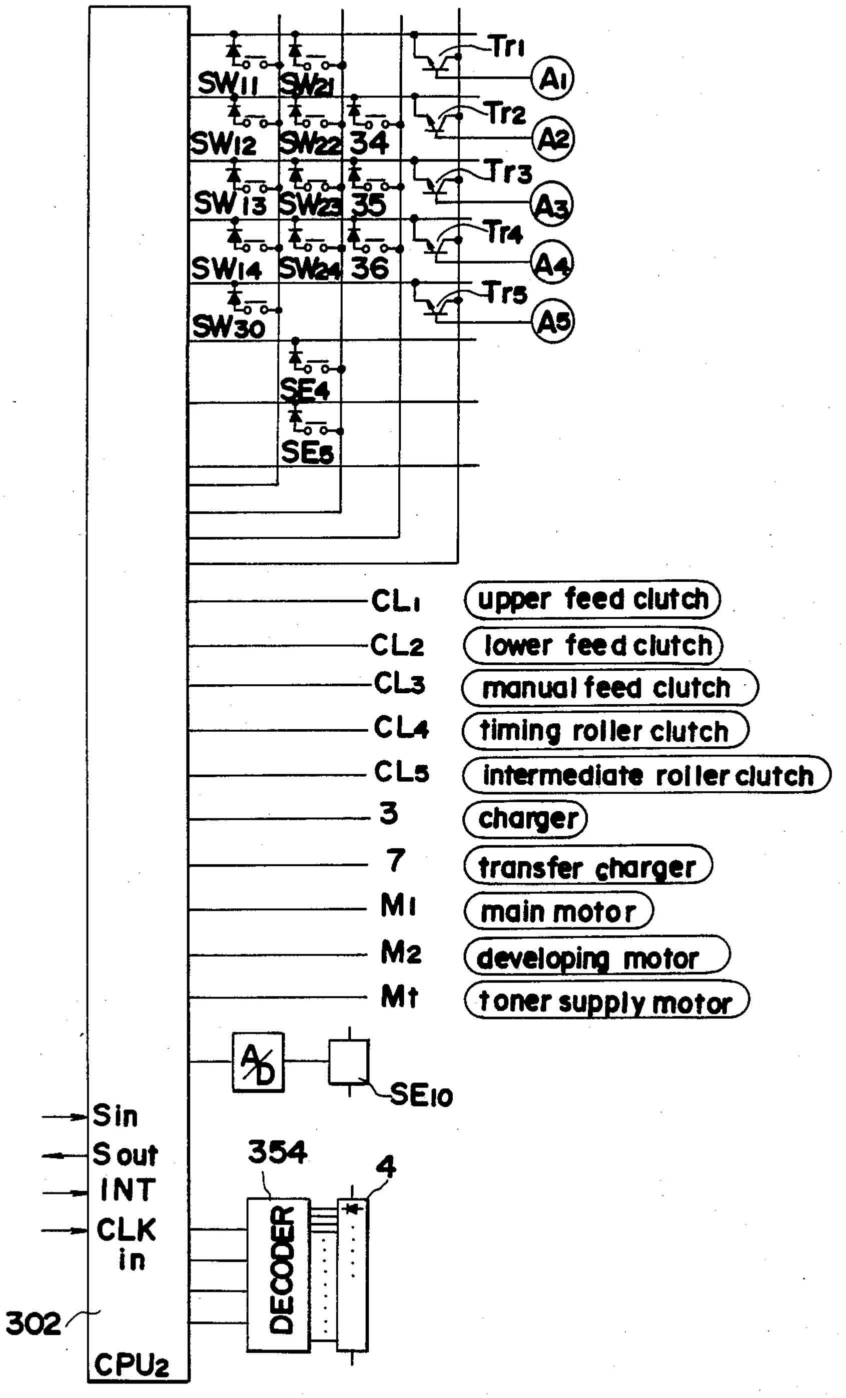

FIG. 6 shows the master CPU 302 and the input-output relationship thereof. The master CPU 302 chiefly controls the operation of the copying machine 100, checks the inputs from various sensors and switches in the copying machine and performs on-off control for the image interval and image end eraser 4 through a decoder 354.

Figure 7:
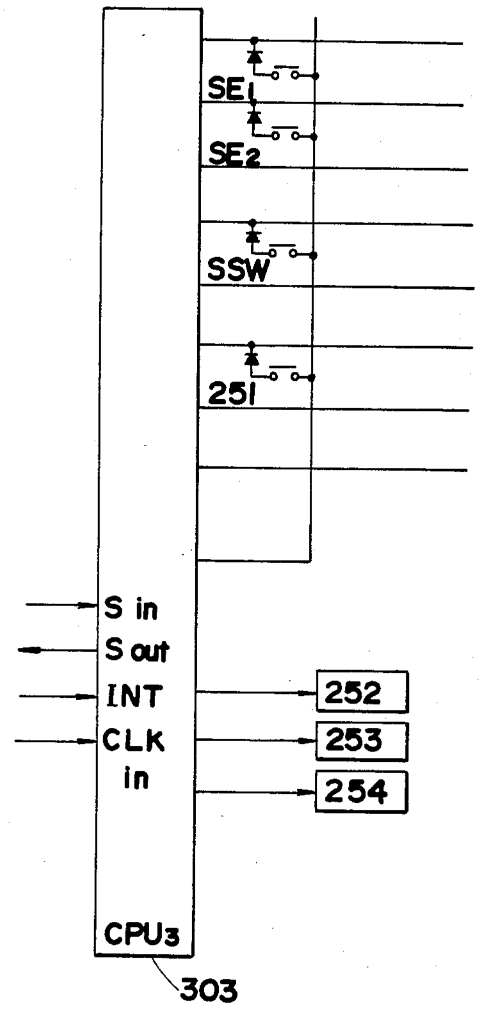

FIG. 7 shows the CPU 303 for controlling the ADF and the input-output relationship thereof. The CPU 303, provided within the ADF 200, is connected to the mode setting key 251, the start key SSW and the document sensors SE1, SE2, feeds the input data therefrom to the host CPU 310 and performs on-off control for the display lamps 252, 253, 254.

Figure 8:
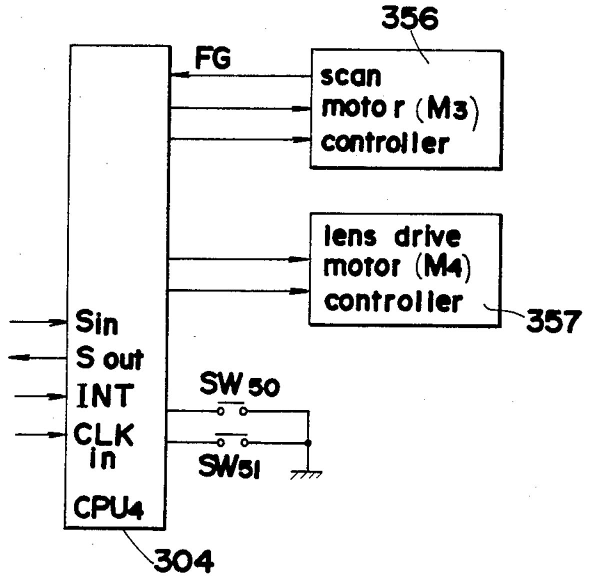

FIG. 8 shows the CPU 304 for controlling the scanning optical system 10 and the input-output relationship thereof. The CPU 304 receives magnification data via the host CPU 301, feeds control signals to a speed control circuit 356 for the scan d.c. motor M3 and to a drive control circuit 357 for the lens-mirror position control stepping motor M4 in accordance with the data and checks the outputs from an exposure start switch SW50 and timing switch SW51 to be actuated with the movement of the scanning system.

Figure 9:
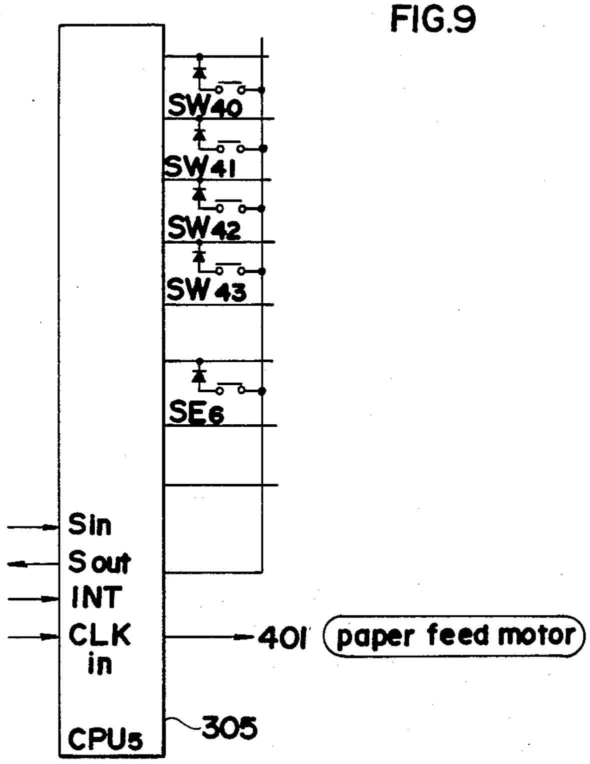

FIG. 9 shows the CPU 305 provided within the paper feed unit 400 for universal use to be described later and the input-output relationship thereof. The CPU 305 receives input signals from paper size sensor switches SW40 to SW43 and a paper absence sensor SE6 provided for the unit 400, transmits the received data to the host CPU 301 and feeds a drive control signal to a paper feed motor 401 for the unit 400.

Figure 10:
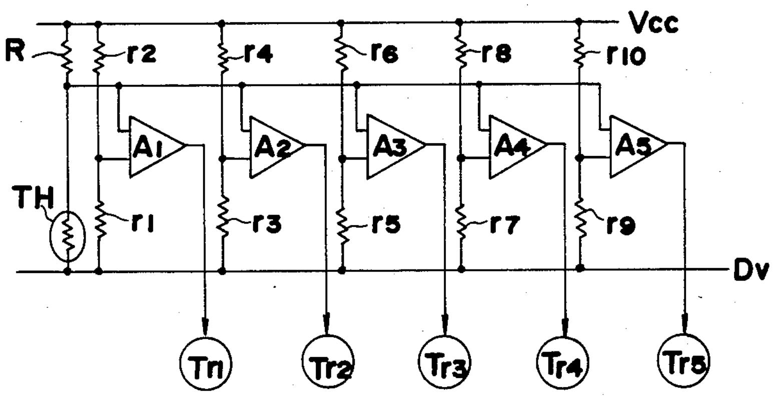
FIG. 10 is a circuit diagram showing a specific example for detecting temperature levels.

FIG. 10 shows a specific example of temperature sensor circuit connected to the bases of transistors Tr1 to Tr5 in the switch matrix of FIG. 6. A temperature-sensitive element TH disposed close to an upper roller *23a* of the fixing unit 23 has its electric resistance varied by temperature changes. The divided voltage derived from d.c. voltage Vcc and available between the element TH and a resistor R is applied to one of the input terminals of each of differential amplifiers A1 to A5. Applied to the other input terminals of the differential amplifiers A1 to A5 are divided voltages which are determined by voltage dividing resistors r1 and r2, r3 and r4, r5 and r6, r7 and r8, and r9 and r10, respectively. With variations in the resistance of the temperature-sensitive element TH, the amplifiers A1 to A5 give an output at predetermined temperature levels to bring the transistors Tr1 to Tr5 into conduction. Control at the temperature levels will be described later specifically.

[Details of Control]

Figure 11:
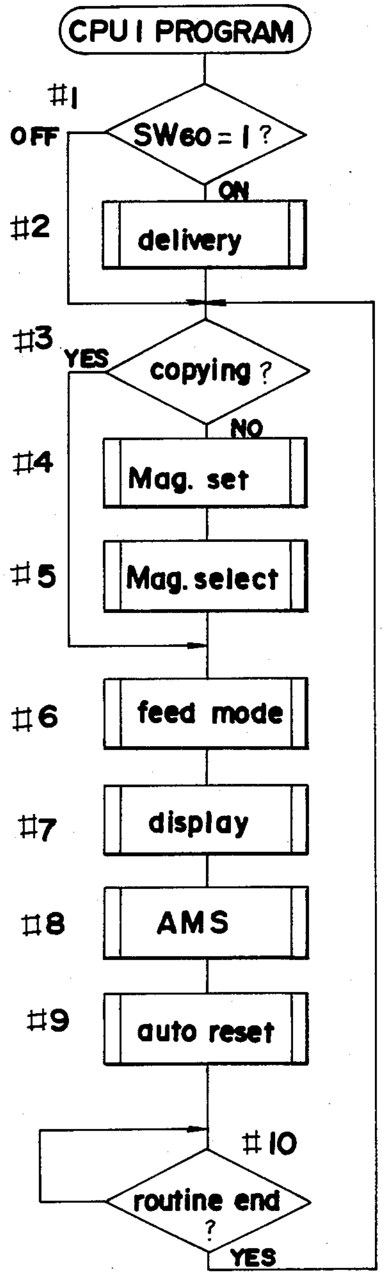
FIG. 11 is a flow chart generally showing the processes to be executed by the host CPU.
Figure 18:
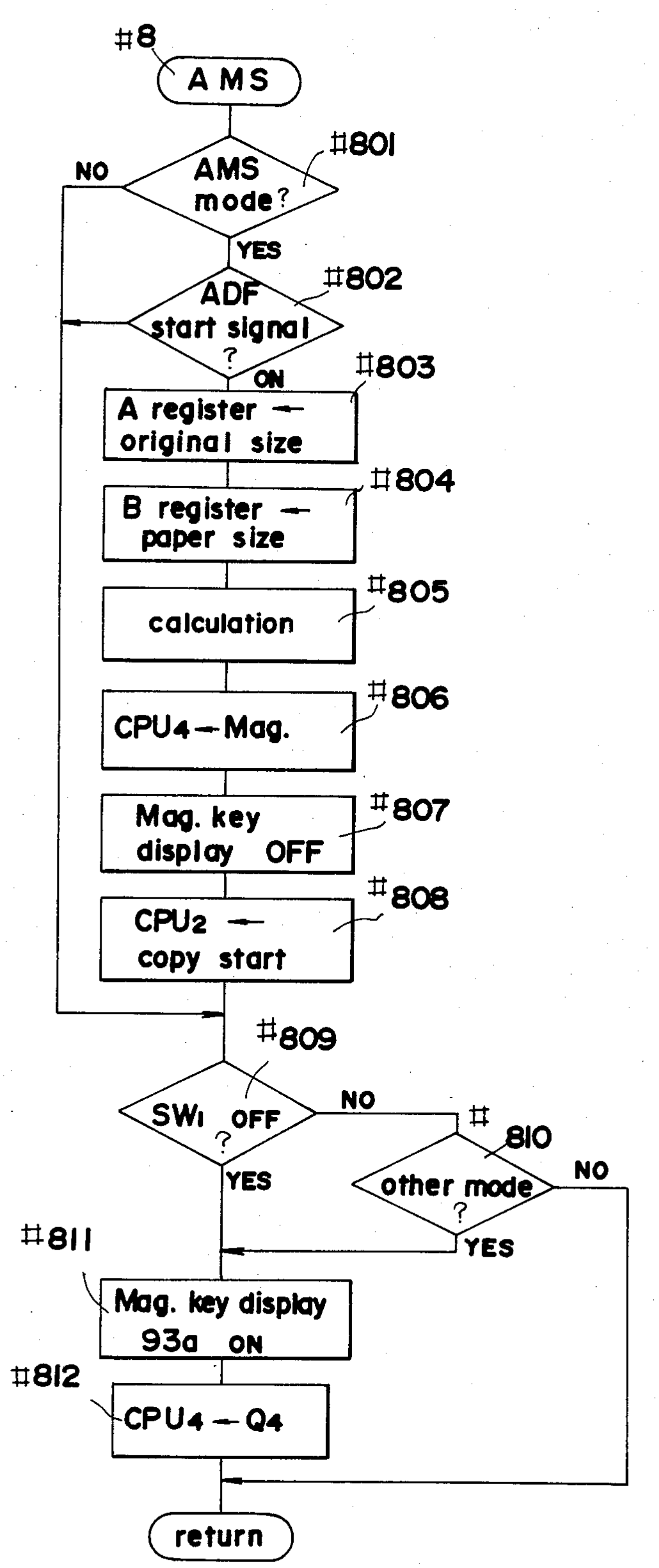
Figure 19:
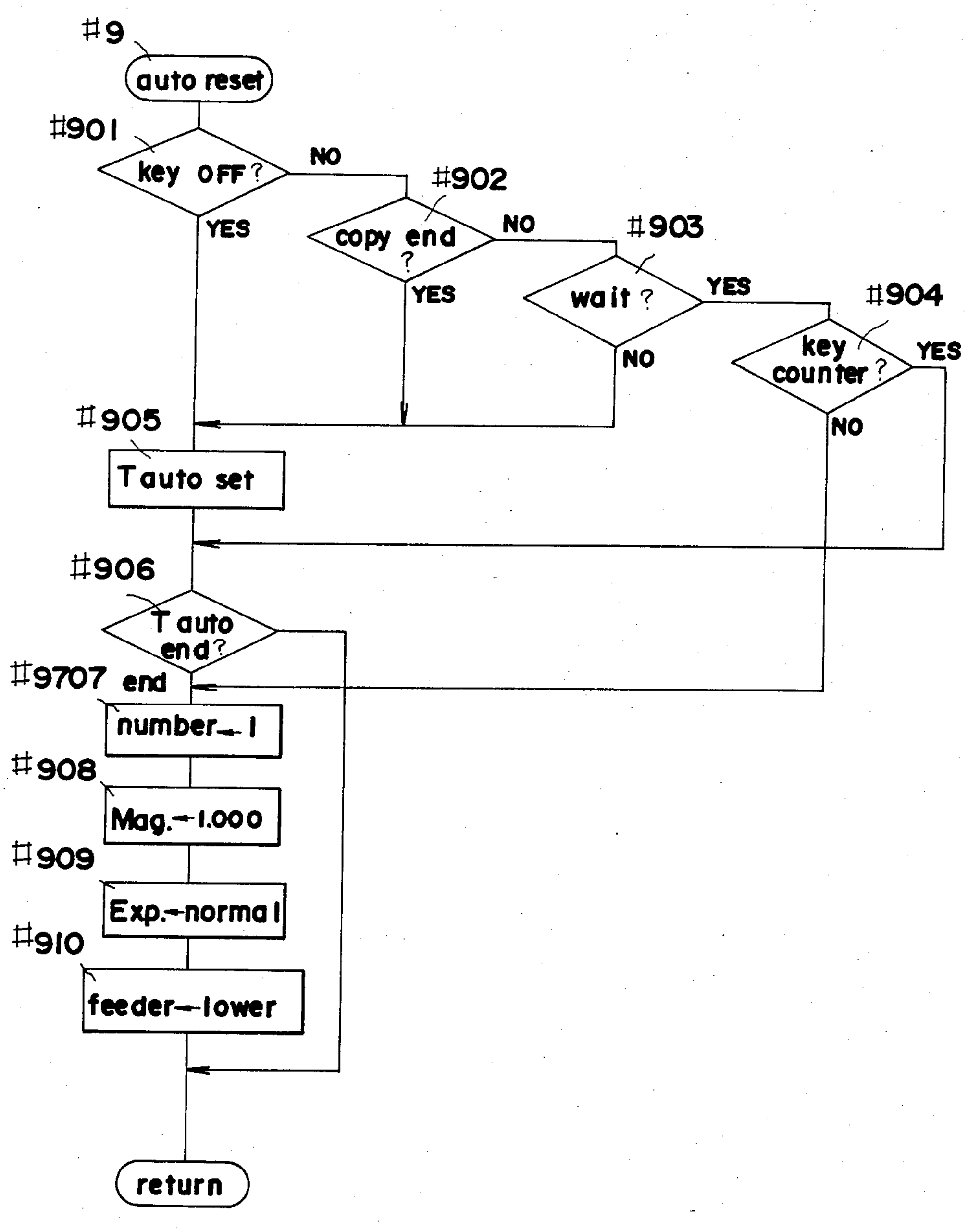
Figure 20:
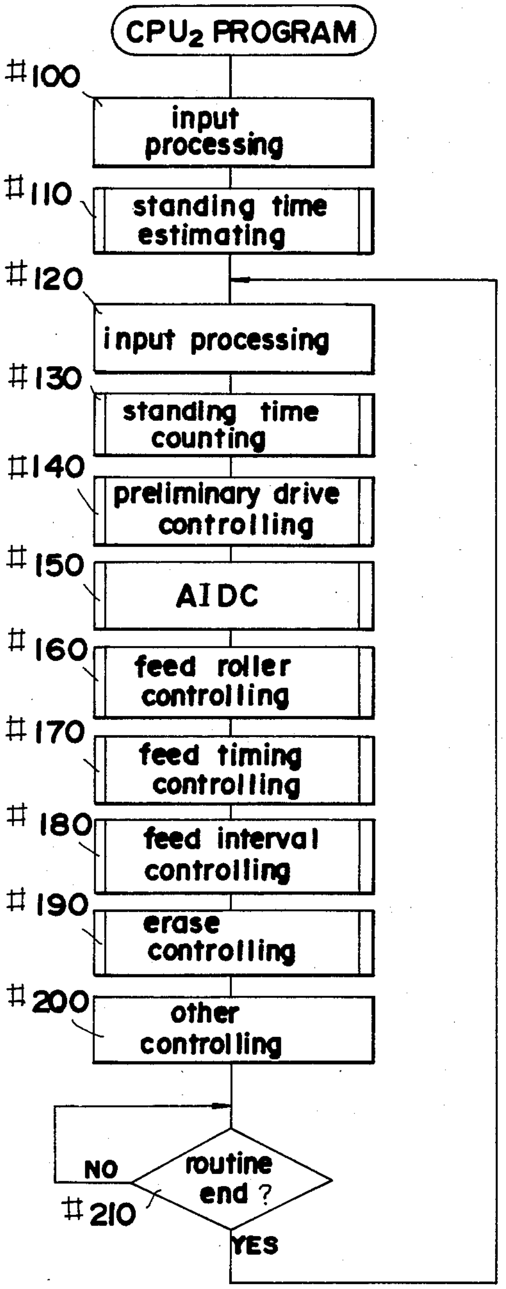
FIG. 20 is a flow chart generally showing the control processes to be executed by the master CPU.

FIG. 11 is a flow chart generally showing the control processes to be executed by the host CPU 301. FIG. 12 to FIG. 19 show the control processes individually in greater detail. FIG. 20 is a flow chart generally showing the control processes to be executed by the master CPU 302. FIG. 21 to FIG. 28 show these control processes in greater detail.

Figure 12:
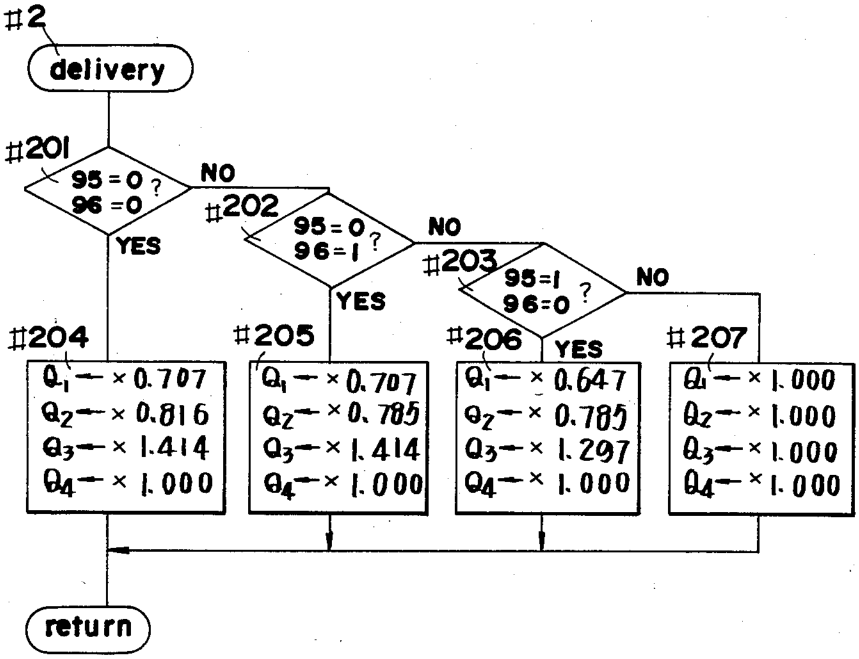
FIGS. 12, 13*a* and 13*b*, 14, 15*a* and 15*b*, and 16–19 are flow charts for illustrating the steps of the processes of FIG. 11 in detail.

First with reference to FIG. 11, steps #1 and #2 are performed usually during assembly of the machine or before the machine is delivered from the factory to preset magnifications in memories Q1 to Q4 provided for the second group of magnification setting keys 90 to 93. Step #2 is shown in detail in FIG. 12. The process of FIG. 12 is executed only when an initial switch SW60 is turned on in step #1. This switch is so positioned within the copying machine that it is not accessible usually but can be manipulated only during assembly in the factory or only by the service personnel.

In steps #3 and #4, a procedure is executed for setting magnifications for the selection keys 85 to 88 or 90 to 93 while the copying machine is out of copying operation. This procedure is shown in detail in FIG. 13 and FIG. 14.

In step #5, data for controlling the lens position and motor drive speed according to the magnification set in step #4 is transferred to the CPU 304 for controlling the optical system. The CPU 304 handles the data by an interrupt. Step #5 is shown in detail in FIG. 15.

Figure 16:
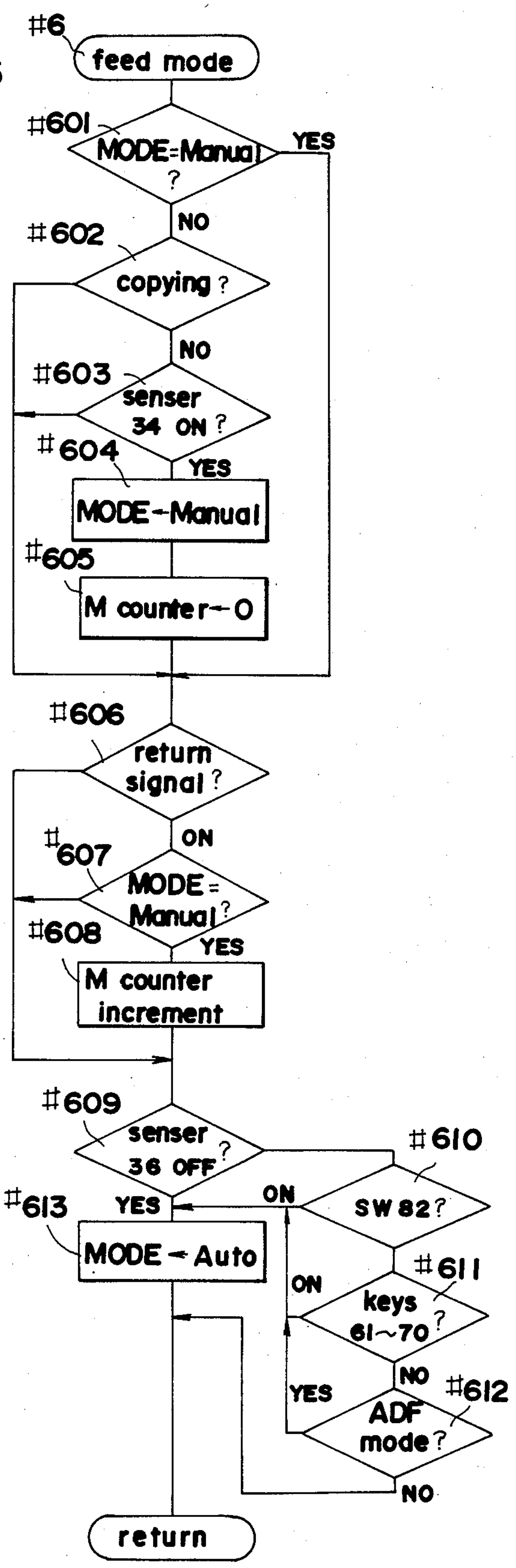

Step #6 is performed for a change of mode between automatic paper feed and manual paper feed. FIG. 16 shows step #6 in detail.

Figure 17:
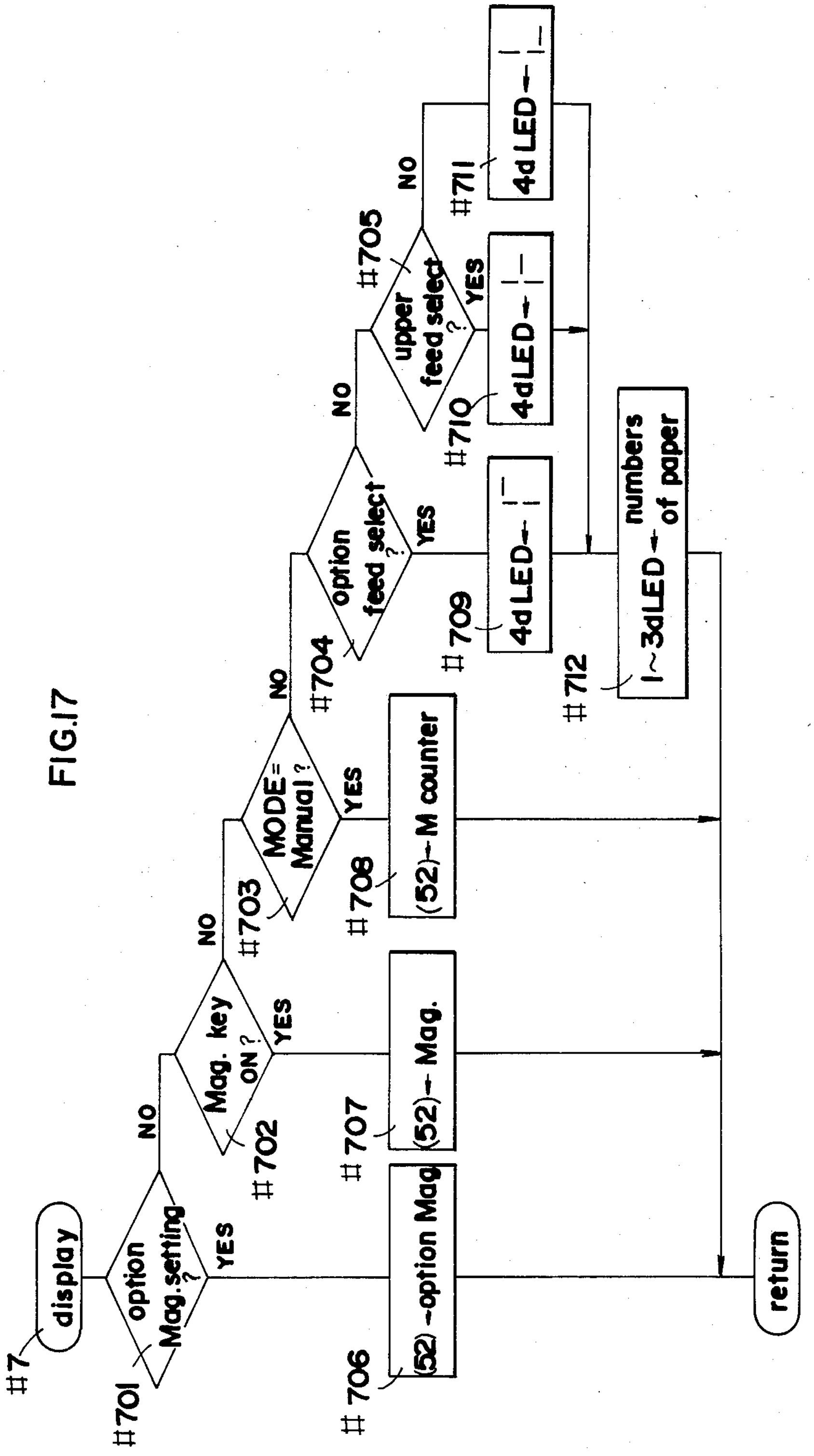

Step #7 is performed for showing the position of a selected paper feed portion on the numerical display 52 provided on the operation panel 50 for indicating numbers of copies and copy magnifications. FIG. 17 shows this step in detail.

Step #8 is the procedure to be followed when "automatic magnification selection mode" is selected on the operating portion 250 for the ADF 200. FIG. 18 shows this step in detail.

Step #9 is an autoresetting process for automatically resetting the number of copies, copy magnification and like variable set items of data to standard data upon lapse of a predetermined period of time after operation keys have been manipulated or after a copying operation has been completed. FIG. 19 shows this step in detail.

Step #10 is a time checking step by which the time taken for the host CPU 301 to execute one routine of control process is made constant irrespective of what is processed. Upon lapse of a predetermined period of time, the sequence returns to step #3 to repeat the foregoing steps.

FIG. 12 is a flow chart showing details of the initial setting process for presetting predetermined numerical values in the memories Q1 to Q4 corresponding to the second group of magnification setting keys 90 to 93.

The memories Q1 to Q4 and memories Q5 to Q8 for the first group of magnification setting keys 85 to 88 are provided in specified areas within the RAM 352 of FIG. 5.

The numerical values to be preset in the memories Q1 to Q4 are determined by manipulating keys 95 and 96 shown in FIG. 1 and FIG. 5 which produces a combination of on-off states of the corresponding switches. More specifically, the switches 95 and 96 are turned on or off by the operator during assembly of the machine or when the machine is to be delivered from the factory according to a predetermined combination, and the initial switch SW60 (see FIG. 1) is closed, whereby the predetermined values are preset in the memories Q1 to Q4. Magnification values for the on-off combinations of the switches 95 and 96 stored in the host CPU 301 can be set in the memories Q1 to Q4 by steps #204 to #207. Table 1 shows examples of preset values for the on-off combinations of the switches 95 and 96.

TABLE 1

| Switch | | Magnification | | | |
|---|---|---|---|---|---|
| 95 | 96 | Q1 | Q2 | Q3 | Q4 |
| 0 | 0 | 0.707 | 0.816 | 1.414 | 1.000 |
| 0 | 1 | 0.707 | 0.785 | 1.414 | 1.000 |
| 1 | 0 | 0.647 | 0.785 | 1.297 | 1.000 |
| 1 | 1 | 1.000 | 1.000 | 1.000 | 1.000 |

Figure 13A:
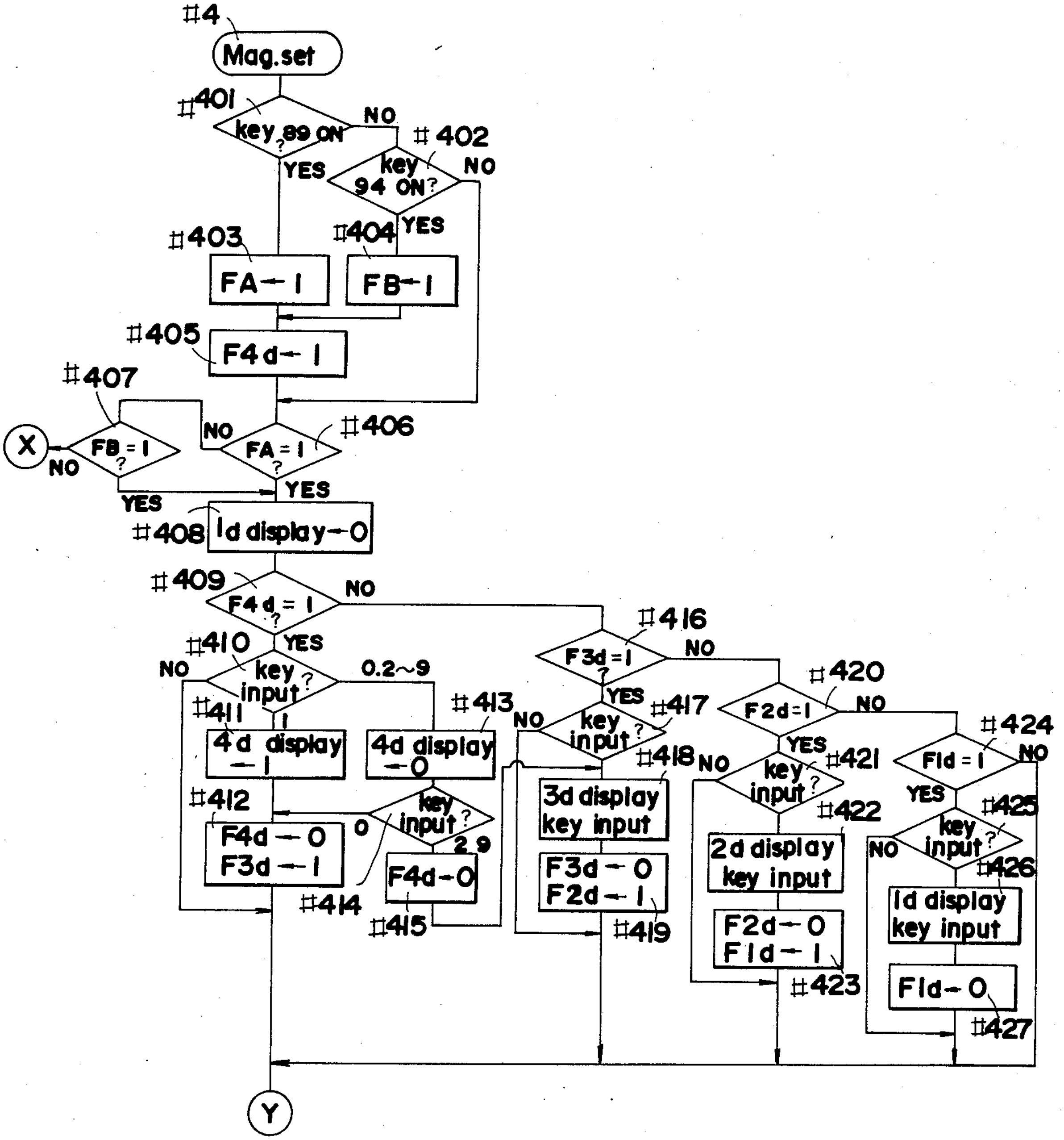
Figure 13B:
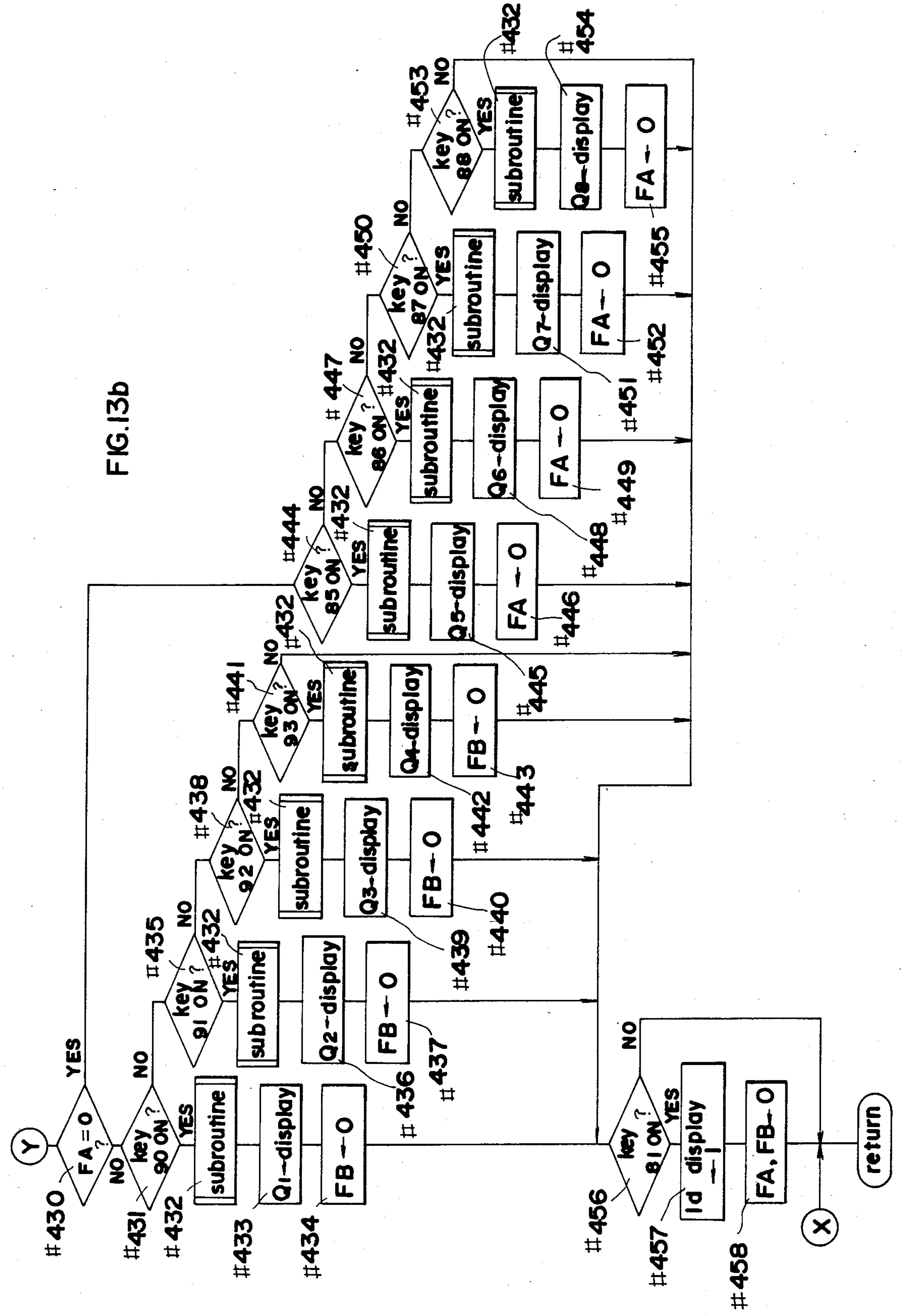
Figure 14:
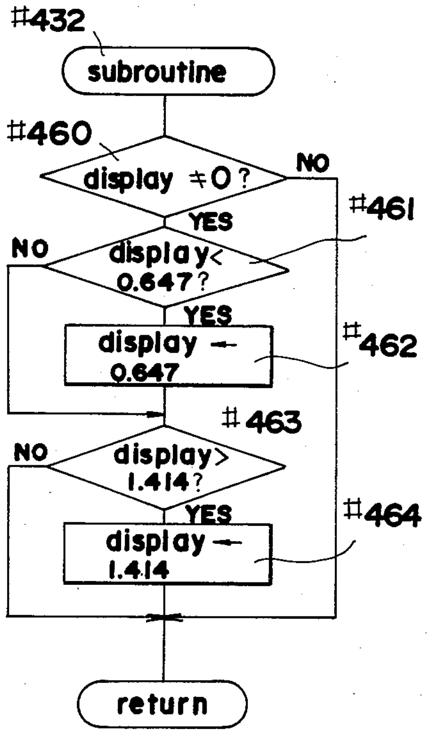
Figure 15A:
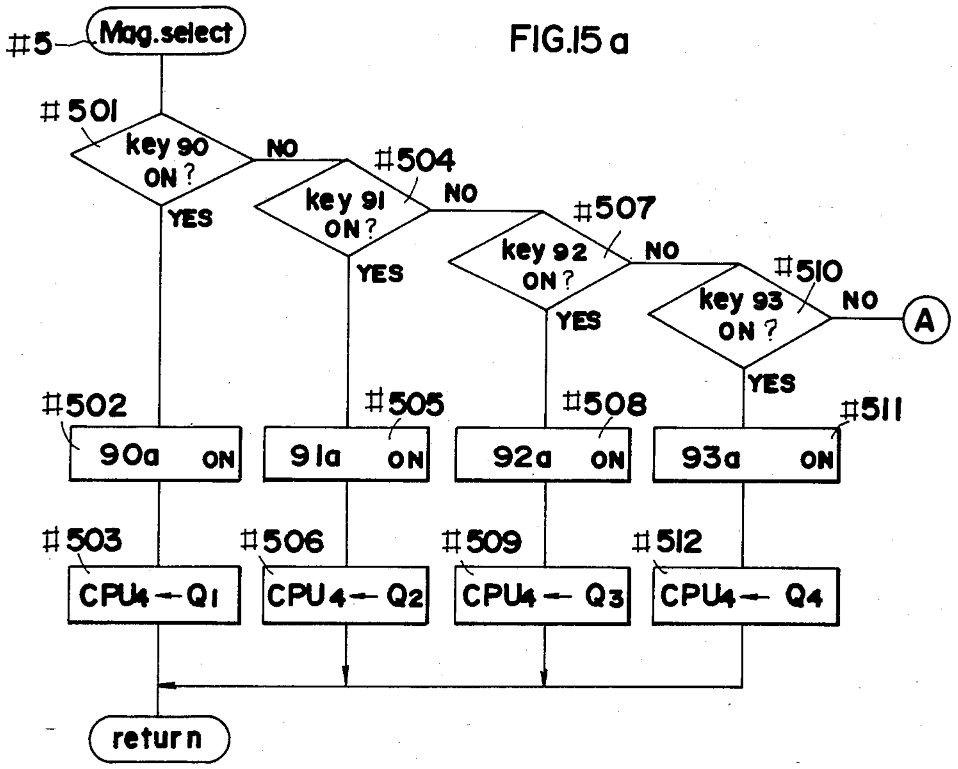
Figure 15B:
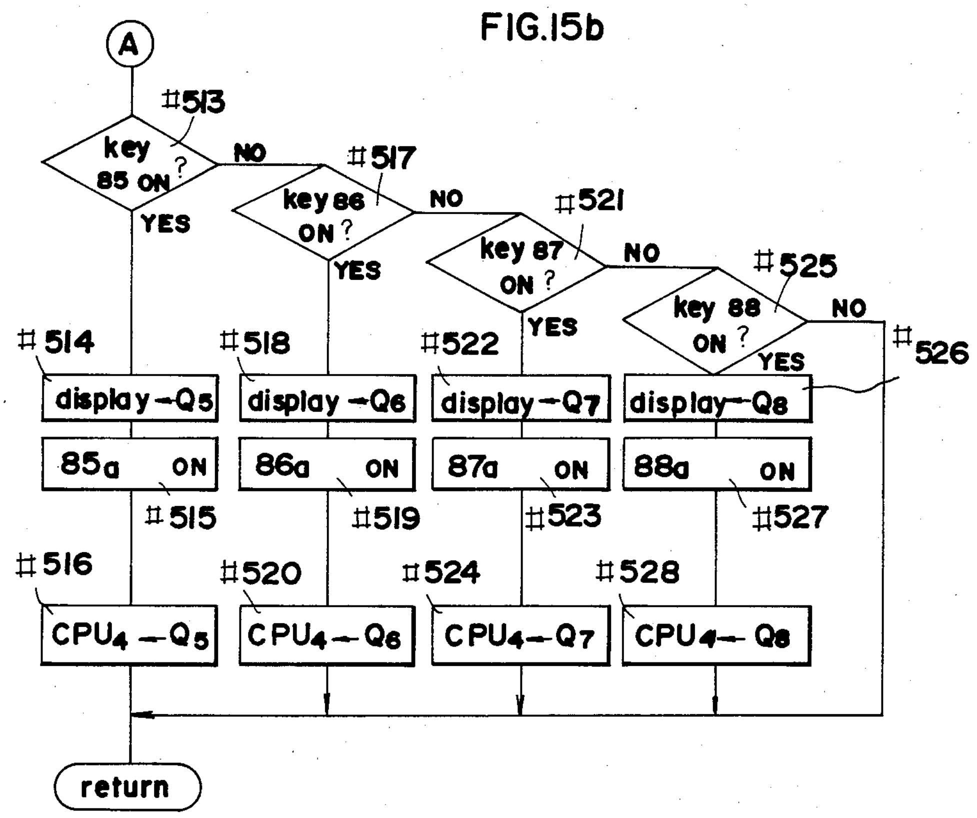

The steps of FIGS. 13 to 15 are performed when desired magnifications are to be set in the memories Q1 to Q4 or memories Q5 to Q8 for the selection keys 90 to 93 or 85 to 88.

With reference to FIG. 13 (*a*), when the key 89 or 94 is depressed to set the machine for the corresponding magnification setting mode, which of the first and second key groups is requested for magnification setting is checked by steps #401 and #402. When the key 89 is depressed for the first magnification setting mode, "1" is set for a flag A in step #403. If the key 94 is depressed, "1" is set for a flag B representing the second magnification setting mode in step #404.

When the key 89 or 94 is depressed, a thousands digit position flag (F4d) is changed to "1", and "0" is displayed in the units digit position in steps #405 to #408. In other words, when the machine is set in the magnification setting mode, the numerical display 52 shows "bbb0" (b:blank), and the control system is ready for receiving inputs, first at the thousands position.

When a numerical key is depressed in this state, step #410 identifies the key. Only when it is "1" key 61, step #411 follows to show "1" in the thousands position. In view of the use of the numerical display 52, numerical values are entered in the thousands, hundreds, tens or units digit position in the following description for the sake of convenience. However, the magnification values are handled as decimal numbers of four significant figures including three figures to the right of the decimal point.

When the value entered is "0" or "2" to "9" with the thousands position flag set to "1", the sequence proceeds to step #413 to show "0" in the thousands position. Subsequently when the input is "0" as when it is "1", step #412 follows to change the thousands position flag (F4d) to "0" and a hundreds position flag (F3d) to "1" for accepting an input to the hundreds position. When the input is "2" to "9", the thousands position flag (F4d) is changed to "0" in step #415, which is followed by step #418 to show the entered value in the hundreds position.

The process described above and to be executed when the thousands position flag is "1" is based on the premisses that the values in the range of 0.647 to 1.414 are handled as effective copy magnifications. Accordingly "1" or "0" only can be displayed in the thousands position. Further the above process assures simplified key manipulation for entering "0" in the thousands position. Depending on the values entered in the hundreds and lower digit positions, the magnification value is likely to be outside the foregoing effective range. Steps to be performed in such an event will be described with reference to the subroutine illustrated in FIG. 13 (*b*) and FIG. 14.

When a value is entered in the thousands position, the hundreds position flag (F3d) is changed to "1". When a numerical key is depressed in this state, the value corresponding to the depressed key is entered in the hundreds position. The value is displayed in step #418, and step #419 is performed for setting the hundreds position flag (F3d) to "0" and a tens position flag to "1". Similarly numerical keys are manipulated for entering values in the tens and units positions.

The flow chart of FIG. 13 (*b*) shows a process by which the numerical value entered and displayed by the procedure of FIG. 13 (*a*) is stored in the memory for the selection key to be subsequently depressed.

Step #430 checks wherher the machine is in the first or second magnification setting mode. Since step #430 is performed only when the flag A or B is "1", this step only checks whether the flag A (FA), for example, is "0". When the flag A is "1", indicating the first mode, steps #444 et seq. follow for checking the first group of selection keys 85 to 88. If the flag A is not "1", that is, if the flag B (FB) is "1", representing the second mode, steps #431 et seq. follow for checking the second group of selection keys 90 to 93 for depression.

Basically, the process of FIG. 13 (*b*) is executed to store the value on display in the memory corresponding to the depressed selection key, irrespective of whether the machine is in one magnification setting mode or in the other mode. As mentioned above, however, a value outside the allowable range of copy magnifications can be on display at the present stage. Accordingly the checking of manipulation of the keys is followed by the subroutine of step #432 so that such a value outside the allowable range will not be stored in the memory. FIG. 14 shows the procedure of step #432.

With reference to FIG. 14, the value on display, when not "0", is checked whether it is smaller than 0.647 in step #460. If smaller, the value on display is changed to 0.647 in step #462. Step #463 checks whether the value on display is larger than 1.414. If larger, the displayed value is changed to 1.414 in step #464.

Thus when a specified selection key is depressed in the magnification setting mode in the process of FIG. 13 (*b*) including the subroutine, the value on display is changed to an allowable limit value if outside the allowable range, and the value displayed is then stored in the memory corresponding to the depressed key. When the process for storing the value has been executed, the flag A in the case of first magnification setting mode or the flag B in the case of the second mode is set to "0", whereupon step #456 is performed.

Steps #456 to #458 are performed when the clear/stop key 81 (see FIGS. 3 and 5) is depressed. Upon depression of the key 81, "bbb1" is shown on the display 52 and the flage A or B is set to "0" in steps #457 and #458. Thus, when the clear/stop key 81 is depressed, the numerical value shown is cleared, and the machine is brought out of the magnification setting mode. Accordingly the value "1" now on display is "1" as the standard set value for the number of copy.

FIGS. 15(*a*) and (*b*) show the processes to be executed when the second group of selection keys 90 to 93 and the first group of selection keys 85 to 88 are depressed, respectively.

With reference to FIG. 15(*a*), when one of the keys 90, 91, 92 and 93 is depressed, the corresponding one of light-emitting diodes 90*a*, 91*a*, 92*a* and 93*a* (see FIG. 3) provided for these keys respectively goes on, and the value stored in the corresponding memory is transferred to the optical system control CPU 304 as magnification data.

With reference to FIG. 15(*b*), when one of the keys 85 to 88 is depressed, the corresponding light-emitting diode similarly goes on. Since these keys are adapted for optional magnification setting, the value set in the corresponding one of the memories Q5 to Q8 is shown on the display 52 in step #514, #518, #522 or #526. The value is shown only while the key is depressed, such that when the key is released, the number of copies set in another memory is retrieved and displayed. Also in the case of the first group of selection keys, the value stored in the memory corresponding to the depressed key is transferred to the CPU 304 as magnification data. Based on the data, the optical system control CPU 304 feeds a control signal to the speed control circuit 356 and to the stepping motor drive control circuit 357, making it possible to perform a copying operation at the set magnification.

FIG. 16 shows a procedure, corresponding to step #6 in FIG. 11, for setting conditions for and controlling automatic-manual paper feed mode change. While the machine is not in the manual feed mode, i.e. while the machine is in the automatic paper feed mode, and provided that the machine is not in copying operation, insertion of copy paper, when detected by the manual paper insertion sensor 34 (see FIGS. 1 and 6), changes the mode to the manual feed mode, and the counter for counting up manually inserted copy sheets is cleared in steps #601 to #605. According to this mode of control, therefore, the paper feed mode is changed to the manual feed mode by the detection of insertion of copy paper by the sensor 34 independently of the opening-closing signal (of the sensor 36) produced by the manual feed table 31. This mode of control actually encounters no problem because the insertion sensor 34 will not function unless the table 31 is open.

In steps #606 to #608, the manual feed counter advances on completion of the scanning movement (return) of the scanning optical system 10 when a copying operation is conducted in the manual feed mode. The counter is provided, for example, in a specified area of the RAM 352. The count on the counter may be shown on the display 52.

In steps #609 to #613, the paper feed mode is changed to the automatic paper feed mode when "automatic mode", i.e. "automatic paper selection" or "automatic magnification selection", is detected by closing of the manual feed table 31 (sensor 36 off), depression of the key 82 for selecting paper of particular size from among those loaded in the automatic paper feeder 20, manipulation of some of the numerical keys 61 to 70, or setting of the operation mode wherein the ADF 200 is used.

Closing of the table 31 indicates that the user has finished an operation by manual feed. Selection of a paper size, setting of the number of copies by numerical keys or setting of ADF automatic mode indicates that the user intends to perform an operation by automatic paper feed. In any of these cases, the automatic paper feed mode is automatically selected, hence convenient. By depressing the paper size selection key 82, depressing numerical keys 61 to 70 or setting the ADF automatic mode, the automatic paper feed mode is selected irrespective of whether the table 31 is open or closed, so that a copying operation can be conducted in the automatic paper feed mode with the table 31 held open.

FIG. 17 shows a control process, corresponding to step #7 in FIG. 11, for changing the display mode of the display 52 in accordance with the prevailing execution mode.

When setting of a magnification (see FIG. 13) or depression of the magnification key (see FIG. 15) is detected in steps #701 and #702, or #706 and #707, a value representing the magnification is displayed as shown in FIGS. 13 and 15.

Steps #703 and #708 show that when the machine is in the manual paper feed mode, the display 52 indicates the frequency of copying cycles executed. The frequency is counted as shown in FIG. 16.

In steps #704, #705 and #709 to #712, the position of the paper feed portion selected is shown by the indicator in the thousands digit position of the display 52 (see FIGS. 3, 5 and 13, and the description concerned), making use of a 7-segment arrangement as illustrated.

Figure 29:
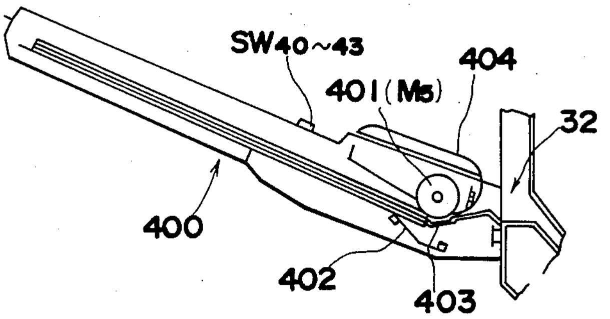
FIG. 29 is a sectional view showing the construction of a paper feed unit for universal use and the relationship thereof with the copying machine.

For option paper feed mentioned as step #704, the manual feed table 31 is replaced by a paper feed unit 400 which is removably attached to the main body as seen in FIG. 29 for automatically feeding copy paper. The feed unit 400 has incorporated therein a feed roller 401 and a feed motor M5 (not shown) which is provided specifically for the unit. When the paper is to be sent out by the rotation of the feed roller 401 against which the paper is pressed by a lift member 402, the uppermost sheet only is separated off by a separating member 403 and forwarded into the machine through the manual feed inlet 32. Mounted on an upper portion of the main body of the unit 400 is a manual feed guide 404, by which copy paper can also be fed manually. When attached to the copy machine main body, the feed unit 400 is electrically connected to the main body, and the control CPU 305 is associated with the host CPU 301 as already stated. When paper feed from the unit 400 is selected by the procedure to be described later, the machine may be controlled in the same manner as in the case where insertion of copy paper is detected by the sensor 34 while the manual feed table is open, or installation of the feed unit 400 may be detected for a special mode of control. In either case, the manual insertion counter does not operate when the unit 400 is selected, and the display 52 shows the set number of copies in the usual mode.

On the other hand, the paper selection key 82 on the operation panel 50 of FIG. 3 is so adapted that every time the key 82 is depressed, the sizes of copy paper in the paper feed portions are indicated one after another by suitably turning on light-emitting diodes 82*a* to 82*d* in corresponding relation thereto. The control procedure for such paper selection and display in which the size is in preference is already known and therefore will not be illustrated or described in detail. The size-preference method of selecting and displaying a particular paper feed portion has the drawback that the paper feed portion actually selected is difficult to recognize. In the control process of FIG. 17, therefore, the paper feed portion for the paper of the size indicated by one of the diodes 82*a* to 82*d* is displayed in the uppermost digit position (thousands position) on the numerial display 52 as apparent from steps #709 to #711. In this case, the copying machine is in the usual control mode, so that the lower three digit positions of the display 52 are used for showing the copy number setting (step #712). However, the display 52 is adapted for setting and showing magnifications in 4-digit values, and the seven-segment indicator for the uppermost digit position is usually left unused. Accordingly, as shown in steps #709 to #711, the indicator is adpated to show an upper position (feed unit 400), middle position (upper cassette) and lower position (lower cassette) as discriminated from one another with conrolled outputs. The display is given also in the operation mode wherein the ADF 200 is used.

FIG. 18 shows a control process, corresponding to step #8 of FIG. 11, for the "automatic magnification selection" mode with use of the ADF 200. While the "automatic magnification selection" mode has been described with reference to FIG. 2 showing the ADF 200, a detailed description will be given. When this mode is selected by depressing the mode selection key 251 shown in FIGS. 2 and 7, information to that effect is transmitted from the CPU 303 to the host CPU 301 and is checked in step #801, whereupon the following steps #802 to #808 are executed.

When the start switch SSW for the ADF 200 is checked for depression in step #802, the document size and the copy paper size identified by the foregoing methods are made into codes, which are stored in registers individually. The proper magnification is calculated from the two items of data. The result of calculation is transferred to the optical system control CPU 304 to turn off all the display light-emitting diodes 85*a* to 88*a* and 90*a* to 93*a* relating to the selection of magnification and give an instruction to the master CPU 302 for initiating a copying operation. In the "automatic magnification selection" mode, therefore, copying operation is carried out at the magnification calculated from the document size and the copy paper size, independently of the magnifications preset in the memories Q1 to Q8.

When step #809 or #810 of the present control process detects that the DF unit 202 has been lifted (SW1 off) or that the "automatic magnification selection" mode has been cancelled, step #811 turns on the display 93*a* for the X1 magnification key 93, and step #812 transfers the data in the corresponding memory Q4 to the optical system 304. Thus, when the user discloses his intention not to continue copying operation in the "automatic magnification selection" mode, the display of magnification selection is returned to the original state, and X1 as the standard magnification is selected. While disconnection of the key counter KC may be considered as an expression of the intention not to continue copying operation in a similar sense, X1 magnification is selected and displayed in this case through the next process of step #9.

The size of copy paper loaded on the paper feed unit 400 can be discriminated, for example, by detecting the movement of width regulating plate through switches SW40 to SW43 mounted on the unit main body, according to predetemined (4-bit) size codes.

FIG. 19 shows an autoresetting procedure corresponding to step #9 of FIG. 11. When the copying machine is allowed to stand without any operator's action for a predetermined period of time after manipulation of a key, completion of copying operation, complete rise of the temperature of the fixing unit (cease of waiting) or the like as in steps #901 to #903, variable set items of data are automatically reset to standard data.

The autoresetting timer used for this purpose is set, for example, to a period of about 30 seconds to about 1 minute. If the copying machine is allowed to stand for this period of time, this is so interpreted that the user has no intention to make copies under the prevailing condition settings. Consequently the variable settings are changed to the standard conditions of: copy number setting=1, magnification=X1, exposure condition=standard, and paper feed inlet=lower or paper size=A4 (paper feed mode=automatic), as represented by steps #907 to #910 illustrated.

Further in the present control procedure, step #904 checks the key counter KC for disconnection (SW10 off). When it is disconnected, steps #907 to #910 immediately follow before the time set on the autoresetting time is up for the following reason. Since the disconnection or withdrawal of the key counter KC indicates completion of the user's copying operation, the autoresetting procedure, even if executed immediately thereafter, entails no actual problem; resetting of the data to the standard values before the lapse of the set time rather assures a saving in time.

According to the present embodiment, the key counter KC, which is already known, is attached to the copying machine 100 for copying operation, while the key counter KC is replaceable by means utilizing a magnetic card or like record medium proposed or provided in recent years. Thus, the control procedure of FIG. 19 may be so modified that withdrawal of such a card is detected by a reader, followed by steps #907 to #910.

FIG. 20 is a flow chart generally showing the items to be controlled by the master CPU 302 and procedures therefor. The master CPU 302 primarily controls the operation of the copying machine as already described and executes control processes in connection with various sensors and switches within the machine 100.

Step #100 is input processing for switches and sensors on turning on the power supply and further includes detection of the amount of remaining copy paper and handling of signals from the temperature sensors TH for performing step #110.

Step #110 detects the temperature of the roller 23*a* of the fixing unit 23 to thereby estimate the period of time needed for allowing the copying machine 100 to stand (standing time) and obtain data as to the rotation (preliminary drive) of the photoconductive drum 1 preceding a copying operation and to be effected in step #140.

Step #120 is input processing for sensors and switches to be executed for every control routine of the CPU 302.

Step #130 is a procedure for measuring the standing time of the copying machine 10 while the power supply (main switch) is on.

Figure 23:
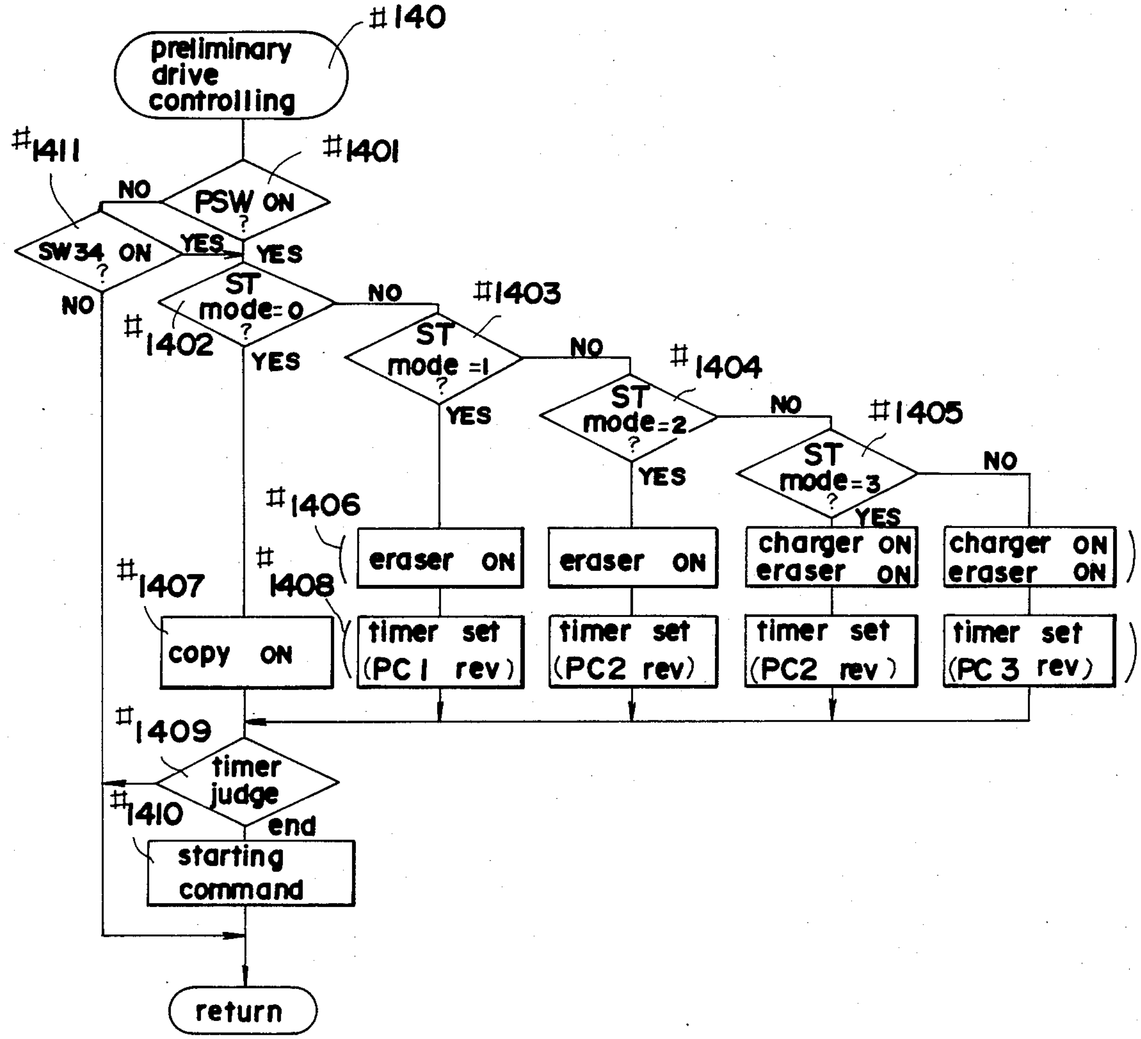

Step #140 is a procedure for controlling the preliminary drive of the drum 1 when a copying operation is to be started, based on the data obtained in step #110 or step #130. FIG. 23 shows the procedure in detail.

Figure 24:
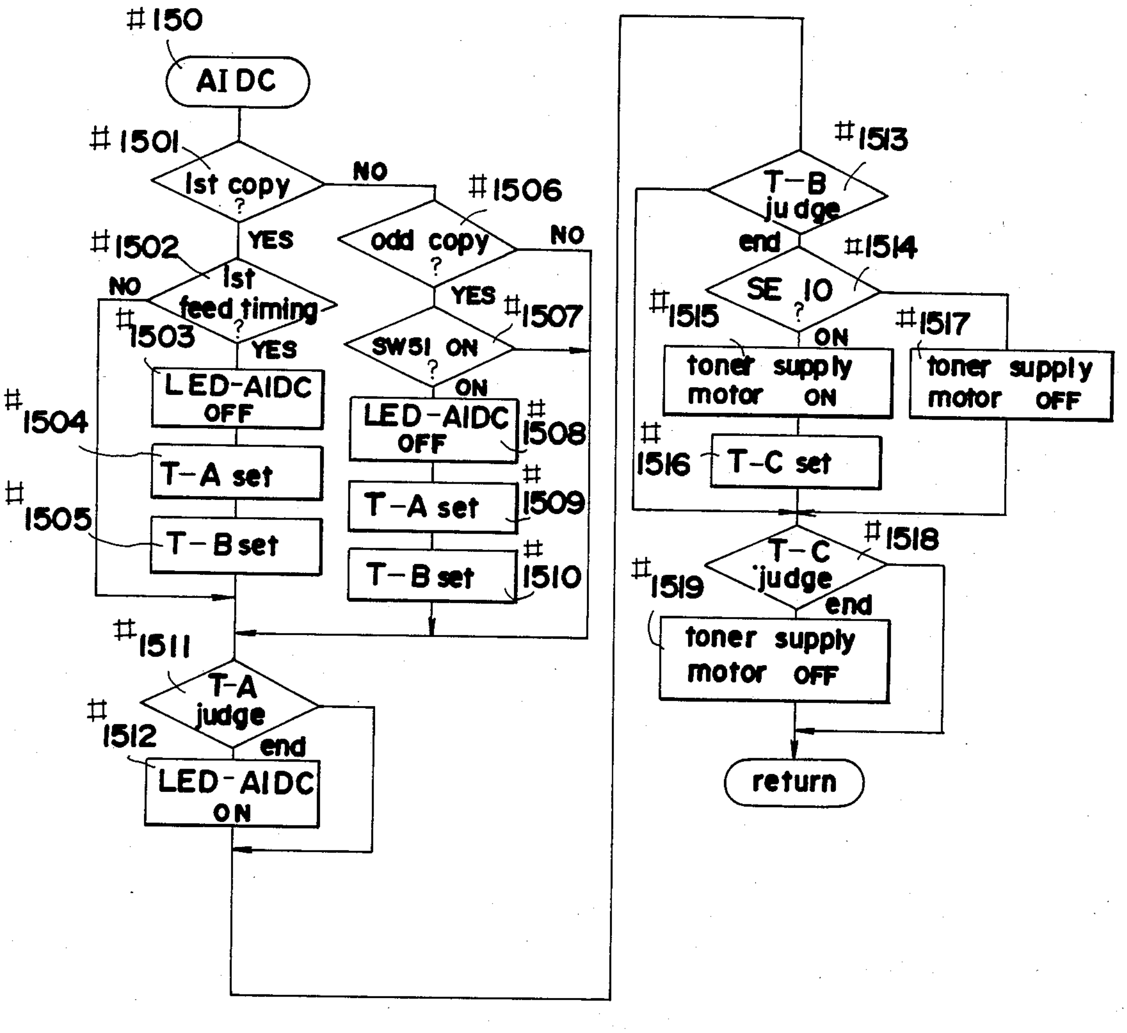

Step #150 is a control procedure which is executed within the copying machine for automatic image density control (hereinafter referred to as "AIDC"). FIG. 24 shows the procedure in detail.

Figure 25:
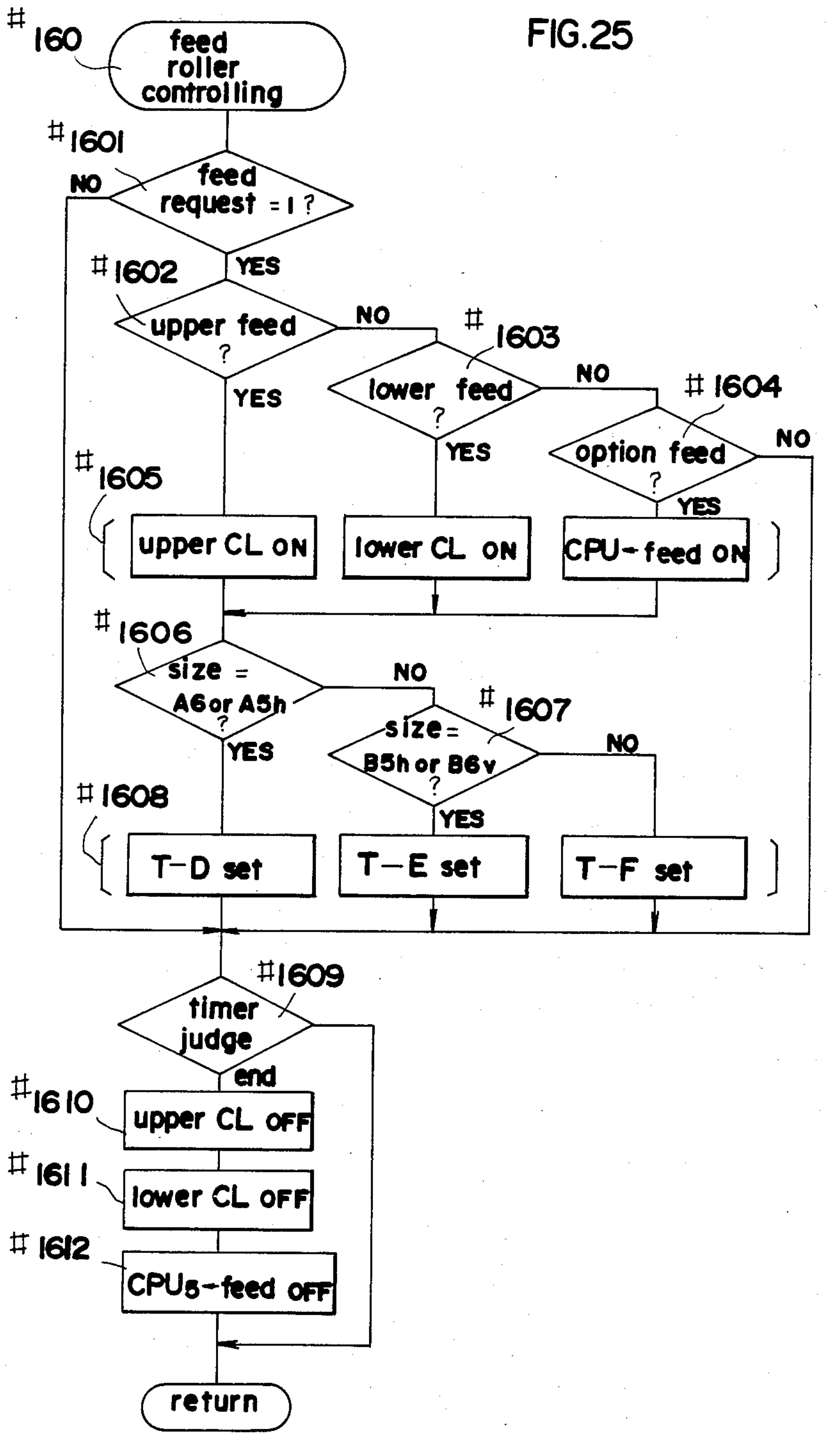

Step #160 is a process for varying the operating time of the paper feed roller in accordance with the size of the copy paper used when paper feed operation is to be started with copying operation. FIG. 25 shows the process in detail.

Figure 26A:
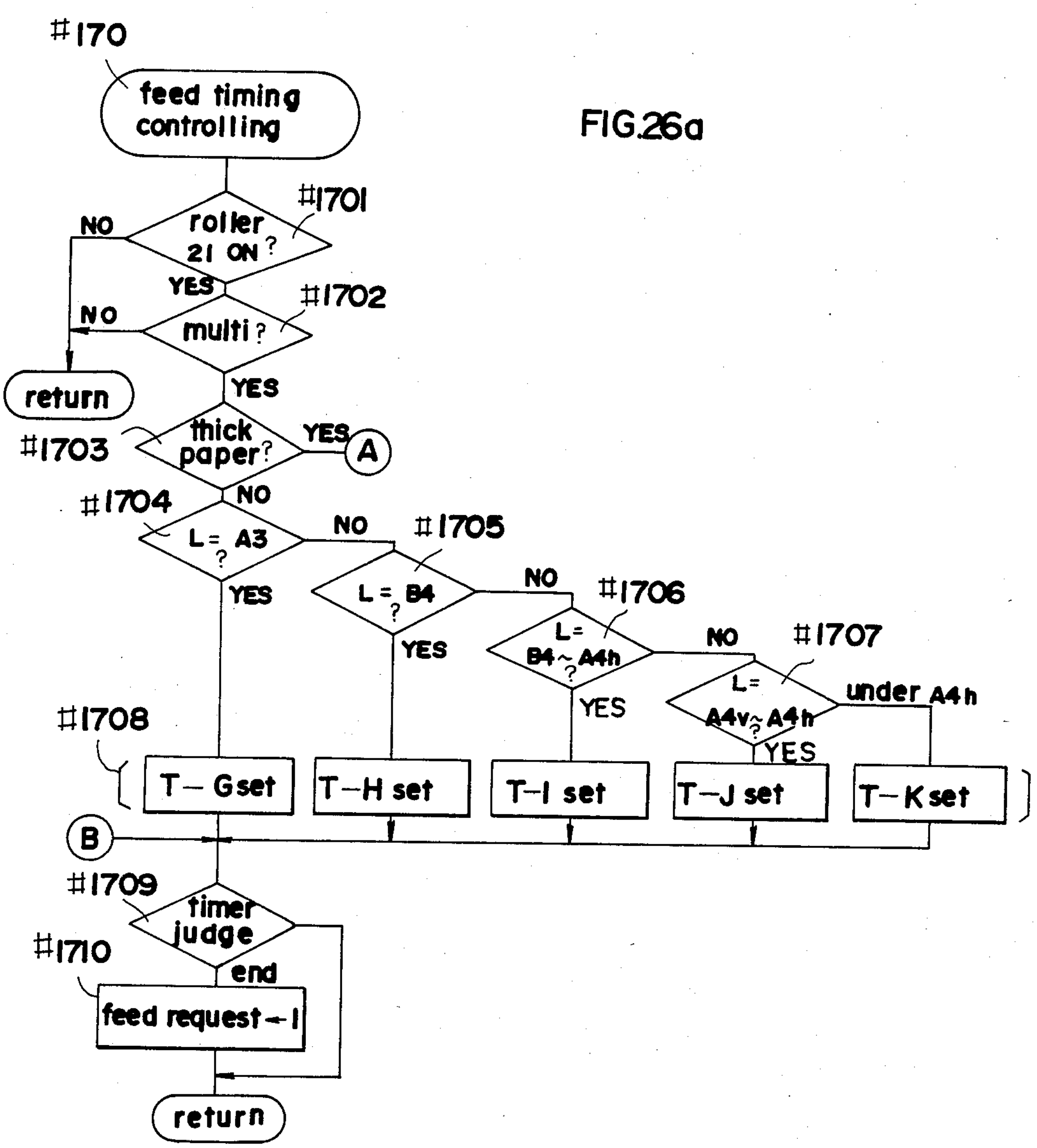
Figure 26B:
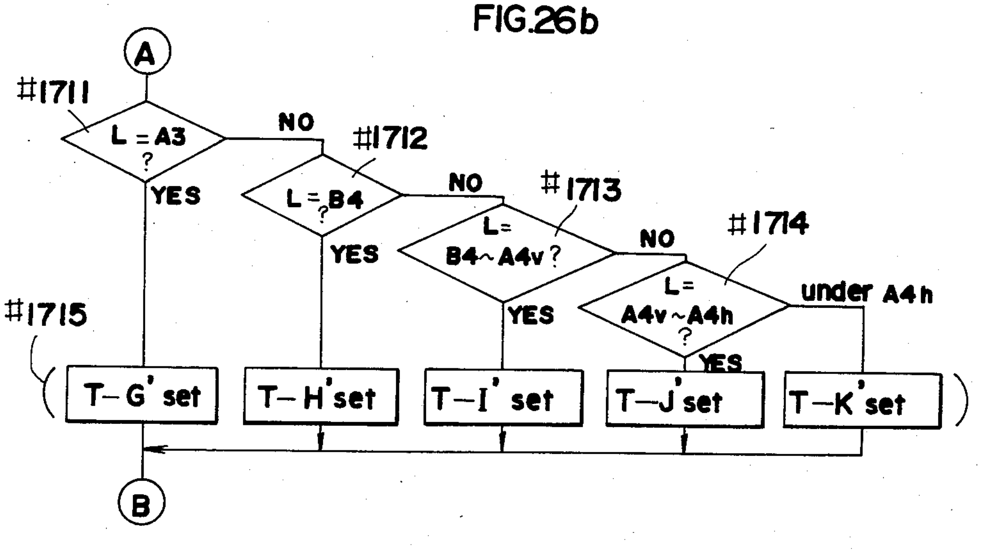

Step #170 is a process for changing automatic paper feed timing according to the size of paper for continuous copying, especially for changing the usual paper feed timing when using paper of larger thickness. FIGS. 26 (*a*) and (*b*) show the process in detail.

Figure 27:
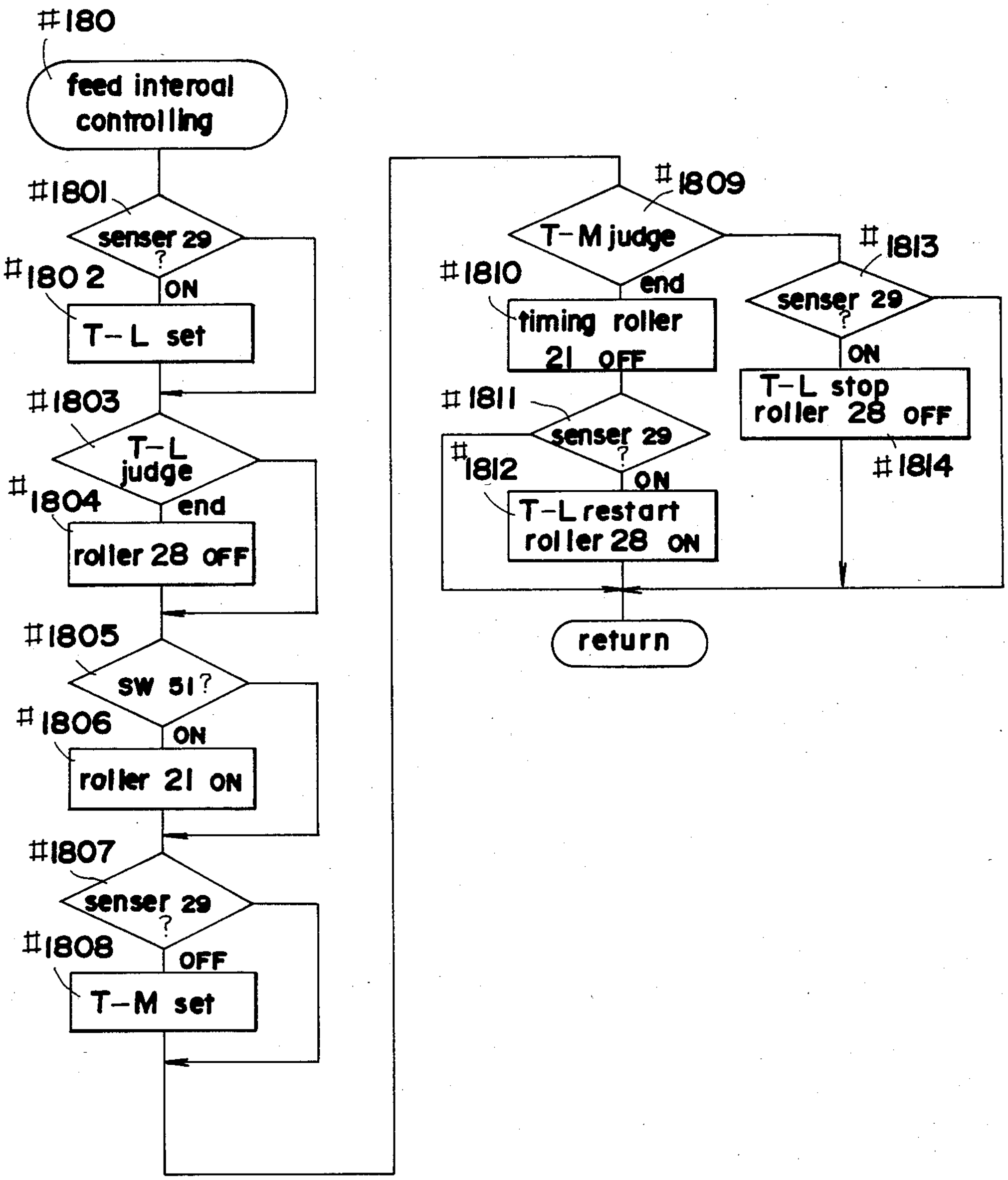

Step #180 is a procedure for regulating at the timing roller portion the spacing between copy paper sheets which are fed in succession. FIG. 27 shows the procedure in detail.

Figure 28:
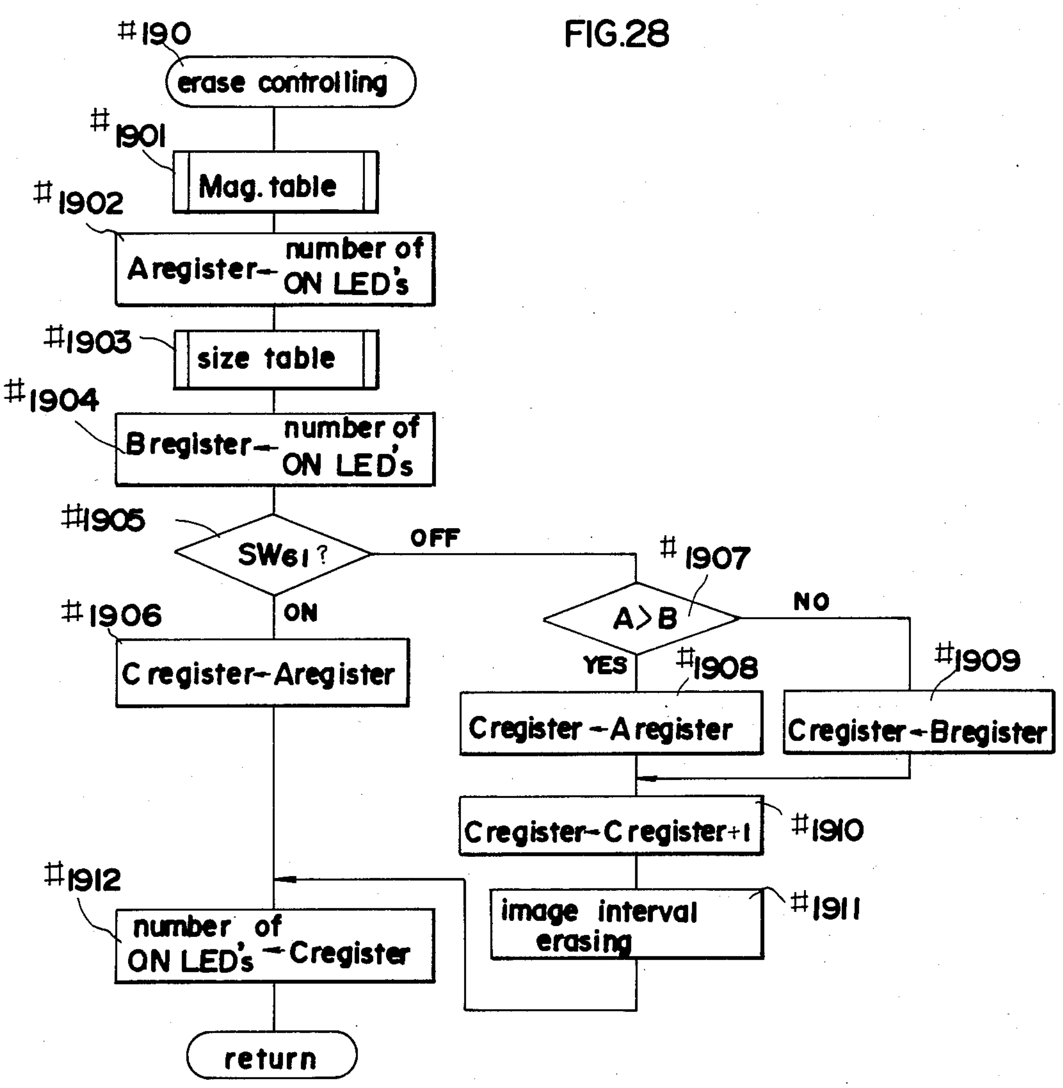

Step #190 is a control procedure for eliminating the black frame to be formed around the copy image area when copying operation is conducted with the DF unit 202 or document cover (not shown) left open. FIG. 28 shows the procedure in detail.

Step #200 generally shows other control procedures. Step #210 is substantially equivalent to step #10 in FIG. 11.

Figure 21:
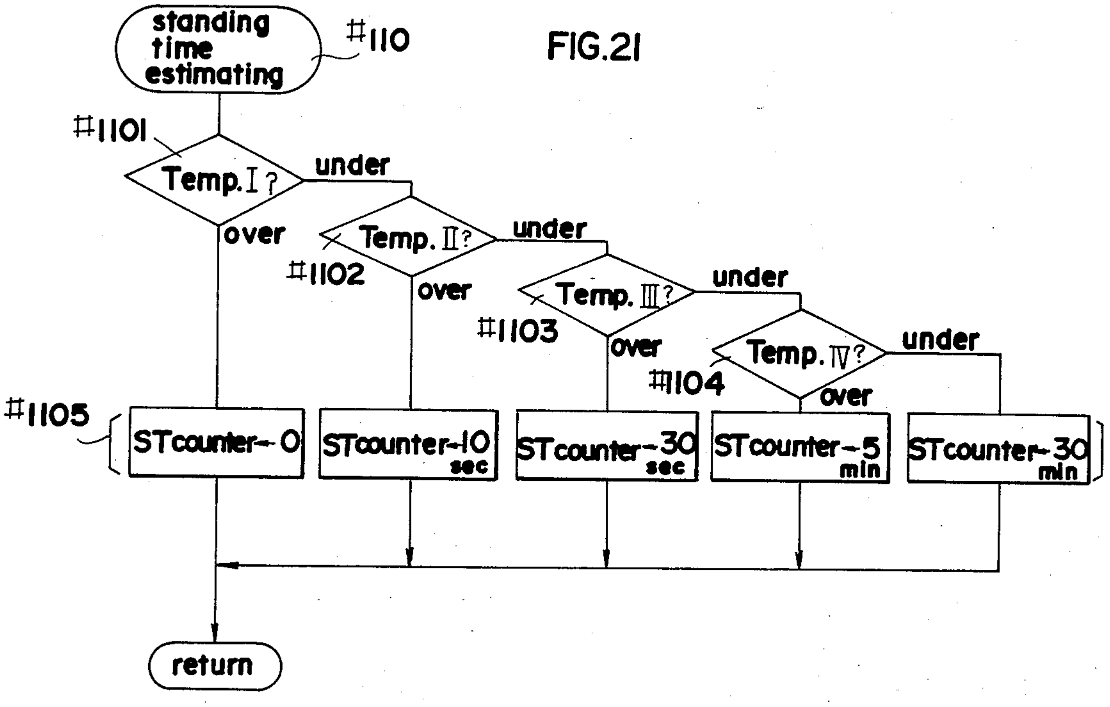
FIG. 21 to FIG. 25, FIGS. 26*a* and 26*b*, 27, and 28 are flow charts for illustrating the steps of the processes of FIG. 20 in detail.
Figure 30:
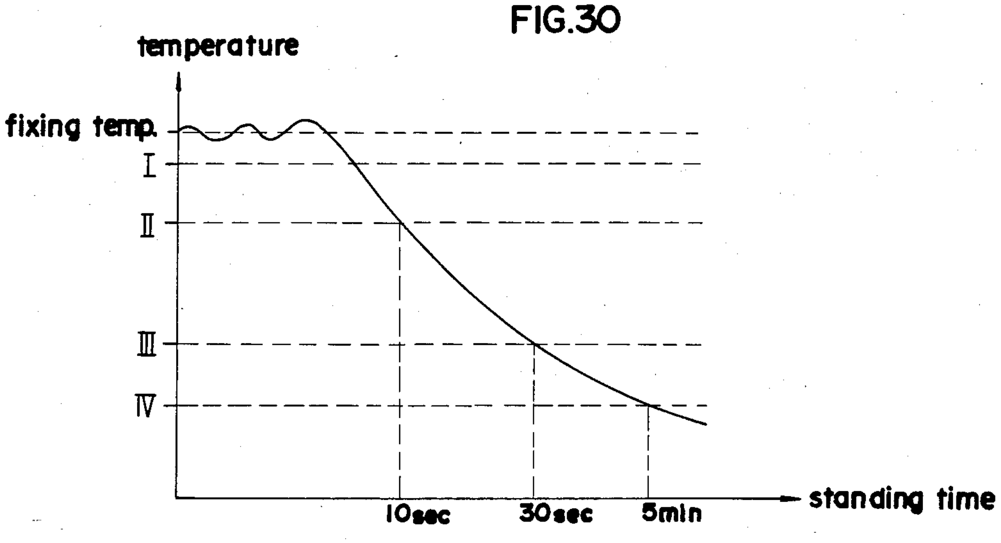
FIG. 30 is a graph showing temperature variations of a fixing unit when it is de-energized.

With reference to FIG. 21, steps #1101 to #1104 discriminate detected temperature levels from the output of the temperature level checking circuit of FIG. 10 which output varies with the output of the temperature sensor TH. The roller temperature of the fixing unit 23 drops with time as shown in FIG. 30 when the supply of current is discontinued after the temperature has risen to the fixing temperature. The relationship between temperature levels I, II, III and IV and time is determined as illustrated based on actual measurements and is stored in ROM or the like. The periods of reference time, "10 sec", "30 sec", "5 min", etc. taken for determining the temperature levels are suitably determined in accordance with variations in the characteristics of the photoconductive member used relative to the standing time.

In step #1105, time data is read out from the ROM according to the temperature level detected, and the estimated time data is transferred to the standing time counter to be stated later. Thus, even when the standing time can not be counted owing to an interruption of power supply to the copying machine 100, the standing time can be estimated when the machine is subsequently energized from the relationship between the temperature variation of the fixing unit and time, whereby control operations, such as sensitivity compensation for the photoconductive member, can be executed.

Figure 22:
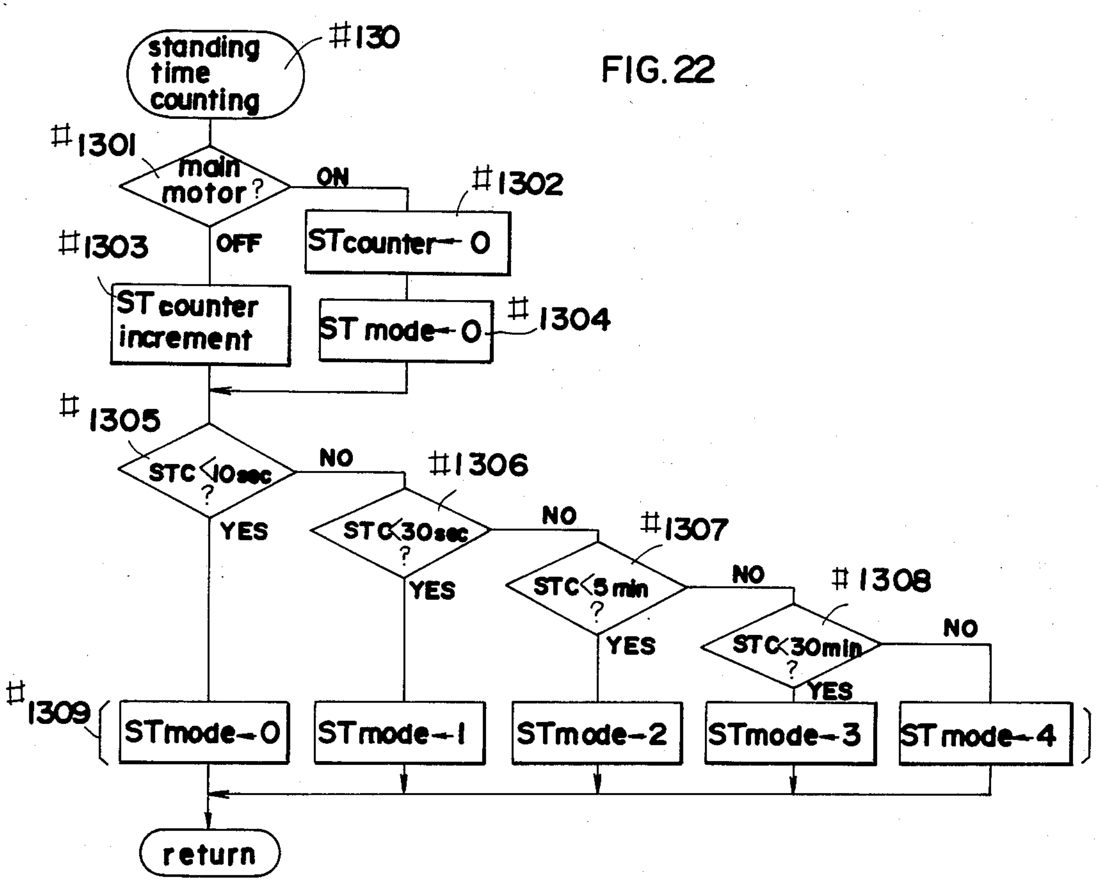

FIG. 22 shows a standing time counting routine which is executed when power is being supplied to the copying machine and which is executed subsequent to the procedure of FIG. 21 when power is supplied to the machine.

The standing time counter is a digital counter provided in a specified area of the RAM or register. In the present embodiment, the counter is so programmed that it is subjected to addition control for every routine of the master CPU 302 when the main motor M1 is at rest. When the counting routine is executed subsequent to the procedure of FIG. 21, the estimated standing time data is first set on the counter, and a further time is added to the data. While the content of the counter and control mode number are cleared upon energization of the main motor M1 in steps #1302 and #1304, the measured time data in the counter is transferred, for example, to a specified register at this time. The data is compared with the aforementioned reference time periods, "10 sec", "30 sec", "5 min" and "30 min", in steps #1305 to #1308. In accordance with the comparable time period, a mode number is determined as selected from the five levels of "0" to "4". The data is transferred to the RAM or register. The standing time data (control mode numbers) obtained in step #110 of FIG. 21 and step #130 of FIG. 22 is used for the preliminary drive control to be executed for starting copying operation in the next step #140 of FIG. 23.

FIG. 23 shows the preliminary drive control process to be executed when the print key PSW is depressed in step #1401 for starting copying operation or when the manual insertion sensor 34 is turned on in step #1411. The process corresponds to step #140 in FIG. 20.

When the print key PSW or the insertion sensor 34 is turned on, steps #1402 to #1405 identify the control mode (standing mode) number relating to the standing time and determined by the process of FIG. 21 or 22. This is followed by the corresponding steps included in steps #1406 to #1408. Steps #1406 to #1408 are as follows. If the mode number is "0" (standing time of up to 10 seconds), depression of the print key PSW is immediately followed by start of copying operation. If the mode number is "1" (standing time of up to 30 seconds), the eraser lamp 2 is turned on, and a timer is set to the period of time taken for one revolution of the drum 1. If the mode number is "2", the eraser lamp 2 is turned on, and the time is set to the time period taken for two revolutions of the drum 1. If the mode number is "3", the eraser lamp 2 and the sensitizing charger 3 are turned on, and the timer is set to the time period taken for two revolutions of the drum 1. If the mode number is "4", the eraser lamp 2 and the sensitizing charger 3 are turned on, and the timer is set to the time period taken for three revolutions of the drum 1.

In any of these cases, the lapse of time set on the timer is detected in step #1409, whereupon a command is given for starting copying operation.

Thus, in corresponding relation to the standing time, the photoconductive member is subjected to the predetermined process while rotating the drum 1 before the start of copying operation to thereby compensate for the initial sensitivity variation, surface potential variation, etc. that would result when the photoconductive drum is allowed to stand at rest.

The items of control for the preliminary drive according to the standing time may be suitably determined, depending on the characteristics of the photoconductive member.

FIG. 24 shows a process, corresponding to step #150 of FIG. 20, for controlling the operation of the copying machine for automatic image density control (AIDC).

The mechanism of AIDC will be described briefly with reference to FIGS. 1, 31 and 32.

Referring to FIG. 1, the photoconductive drum 1, while in rotation, is irradiated with the light of the eraser lamp 2 over the entire surface thereof and is thereafter uniformly charged by the sensitizing charger 3 over the surface. Subsequently charges are removed from the drum surface by the image end and image interval eraser 4 at the areas which are not exposed to light at the image exposure station in the next position, i.e. the space between successive images (image interval) and areas at opposite sides of the image (image ends). Control for removing image interval and image end charges will be described in detail with reference to FIG. 32.

Figure 31:
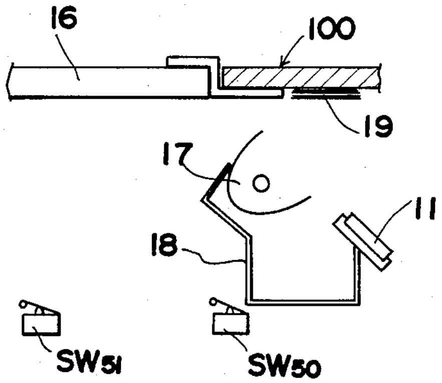
FIG. 31 is a fragmentary view of the copying machine for illustrating an AIDC mechanism.

AIDC is effected before the start of exposure of the drum to the image of a document by projecting a control pattern 19 of specified density onto the surface of the drum 1 for exposure through the scanning optical system 10 including the exposure lamp 17, etc. as shown in FIG. 31, developing the resulting image by the developing unit 6, detecting the density of the toner image on the drum surface by a sensor SE10 provided along the drum 1, determining the detection level by the master CPU 302, and controlling the operation of the toner supply unit (not shown), etc. according to the result to stabilize the image density. AIDC mechanisms of this type are disclosed in detail, for example, in Published Unexamined Japanese Patent Application SHO No. 56-151946.

In forming an electrostatic image corresponding to the pattern 19 on the drum 1, the operation of the eraser 4 is controlled by the process of the flow chart shown in FIG. 24 so as to form an AIDC reference pattern of specified size on the drum surface.

AIDC conducted for making the first copy differs in mode from AIDC effected at the image interval during successive copying cycles. When operation is started for making a single copy or the first of successive copies, a group of light-emitting diodes (LED) 4 included in the eraser 4 for forming the AIDC pattern (see FIG. 32) are turned off with the paper feed timing (step #1502), and timers T-A and T-B are set.

Figure 32:
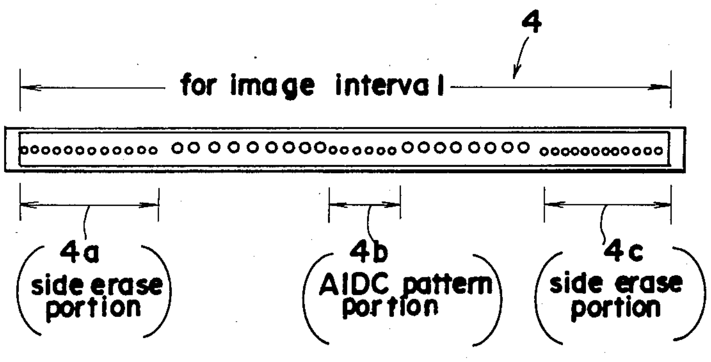
FIG. 32 is a front view showing the construction of image interval and image end eraser.

As seen in FIG. 32, the image interval and image end eraser 4 comprises a multiplicity of LED's arranged in a row. When the eraser functions as an image interval eraser, all the LED's are turned on to irradiate the drum 1 over the entire width thereof, while when an AIDC pattern is to be formed, the middle pattern forming portion 4*b* alone is turned off with suitable timing. When the eraser serves as an image end (side) eraser, side erasing portions 4*a* and 4*c* are suitably and only partially turned on. The LED's are controlled by the master CPU 302 shown in FIG. 6 via the decoder 354.

When step #1501 detects that the machine is in continual copying operation, step #1506 checks whether a copy of odd ordinal number is being made, and the AIDC process is executed only during the cycle for making the copy of odd number in order. At this time, closing of a switch SW51 is detected during the return movement of the scanning optical system 10 for copying operation, whereupon the pattern forming portion (LED group) 4*b* of the eraser 4 erasing the image interval area are turned off, and the timers T-A and T-B are started. AIDC may be executed for every copying cycle, with step #1506 omitted. The switch SW51, when actuated during the forward travel of a movable member 18 included in the scanning optical system 10, emits a signal which serves as a reference signal for driving the timing roller 21 for copying operation.

The LED group 4*b* is turned on upon completion of the operation of the timer T-A in steps #1511 and #1512, whereby the rear end position of the AIDC pattern forming portion is regulated relative to the drum.

Steps #1513 to #1519 show that when the output of the density sensor SE10 indicates that the pattern density is low on completion of the timer T-B, toner is supplied for a period of time determined by a timer T-C to assure the proper image density. The timers T-A, T-B, T-C, etc. may be suitably adjusted, for example, according to the speed of rotation of the drum 1 for copying operation.

FIG. 25 shows a procedure for varying the operating time of the feed roller for each paper feed portion according to the size of the paper to be fed. The procedure corresponds to step #160 of FIG. 20.

Steps #1601 to #1605 show that when a paper feed request of "1" is made by the master CPU 302 with copying operation, the feed roller of the selected paper feed portion is started. If the paper feed unit 400 is installed in place and selected at this time, the paper feed command is forwarded to the CPU 305 for controlling the unit 400.

In steps #1606 to #1612, in response to a size signal for the copy paper loaded in the selected feed portion when the paper feed request is made, the corresponding one of timers T-D to T-F for determining the duration of operation of the feed roller concerned is set, and the roller is stopped upon lapse of the set time.

In view of the relation to the foregoing paper feed system including the separating means, each of the timers T-D to T-F is adapted to set time thereon as related to the paper size so that even when the paper to be fed is positioned close to the separating means in a projecting fashion before the start of paper feed, the feed roller will not rotate after the rear end of the paper has passed the position of the roller.

The mode of control described assures smooth transport of paper without any likelihood of feeding two sheets at a time or other objections.

The paper feed portion may be selected by specifying the paper size first and then selecting the feed portion loaded with paper of the specified size, or by specifying the feed portions one after another.

FIGS. 26 (*a*) and (*b*) show a process for controlling paper feed timing during continual copying operation. The process corresponds to step #170 of FIG. 20.

Steps #1701 and #1702 check whether a signal is emitted for driving the timing roller 21 during continual copying operation. The drive signal for the timing roller 21 is delivered from the switch SW51 shown in FIG. 1, 31, etc. when the switch is actuated by the forward travel of the scanning optical system 10.

Subsequently step #1703 checks whether the copy paper is thick. If it is thick paper, the procedure of FIG. 26 (*b*) follows, while if it is usual paper, the sequence proceeds to steps #1704 et seq. For detecting thick paper, the aforementioned 4-bit code for identifying copy paper size may be adapted to contain data relating to thick paper, or as seen in FIG. 1, a switch SW30 may be manipulated when thick paper is used to utilize the signal therefrom.

In the case where the paper is usual paper or in the case where it is thick alike, one of control timers T-G to T-K or T-G' to T-K' is set based on length data afforded by the size signal for the paper to be used. Step #1709 checks the control timer for the lapse of set time, and step #1710 makes a paper feed request of "1" as already stated with reference to FIG. 25.

For continual copying operation, it is required to start the timing roller 21 to forward a copy sheet, to stop the timing roller 21 after the rear end of the forwarded sheet has passed over the roller 21 and to thereafter cause the leading end of the next sheet to reach the position of the roller 21. To fulfill this requirement, each of the control timers T-G to T-K determines paper feed starting timing for the next sheet in accordance with the size of the sheet (length in the direction of transport). The control timers T-G' to T-K' which are operated for thick paper are adapted to set time thereon according to the size of copy paper as in the case of usual paper. Additionally consideration is given to the drop of temperature of the fixing unit due to the use of thick paper, the time required for the lowered temperature to rise to the fixing temperature level, etc. In this case, the period of time required is determined, for example, by experiments. Stated more specifically, the timers T-G to T-K for usual paper are set to such a period of time that the spacing between successively fed sheets will be about 100 mm on the average. In corresponding relation to this, the timers T-G' to T-K' are set to such a time value that the sheet-to-sheet spacing will be about 200 mm on the average. In practice, the timer value and spacing may be determined suitably according to the paper transport speed, temperature setting and heat capacity of the fixing unit 23, etc.

FIG. 27 shows a procedure, corresponding to step #180 of FIG. 20, for preventing the sheet-to-sheet spacing from becoming excessively small at the position of the timing roller 21 owing to errors involved in automatic paper feed operation when copy paper is forwarded by the process of FIG. 26 during continual copying operation.

When a paper sensor 29 provided between the intermediate roller 28 and the timing roller 21 detects the leading end of a sheet during copying operation, a timer T-L is set in steps #1801 and #1802 for determining the timing to stop the intermediate roller 28 after the sheet forms a suitable loop upon coming into contact with the timing roller 21 at rest. On completion of the operation of the timer T-L (step #1803), the intermediate roller 28 is stopped in step #1804.

When the switch SW51 is turned on with scanning operation, the timing roller 21 is driven (steps #1805 and #1806) as already described with reference to FIGS. 24 and 26, causing the rear end of copy paper to pass over the sensor 29, whereupon a timer T-M is set with off-edge of the detecting signal from the sensor 29 (step #1807). In connection with the sensor 29, the timer T-M is used for the following mode of control.

Usually the timing roller 21 may be stopped on completion of operation of the timer T-M, followed by step #1801 again, but if the sensor 29 is turned on by the next sheet during the operation of the timer T-M, too small a sheet-to-sheet spacing will result. Accordingly the intermediate roller 28 and the timer T-L is temporarily held out of operation in steps #1813 and #1814. Steps #1809 to #1812 show that the intermediate roller 28 is driven again and the timer T-L is re-started, after the timing roller 21 is stopped with completion of operation of the timer T-M. At this time, steps #1801 and #1802 are executed with on-edge of the signal of the sensor 29, so that the intermediate roller 28 is stopped on completion of operation of the timer T-L.

The control thus effected eliminates objections, such as erroneous operation and improper timing, that could result from too small a sheet-to-sheet spacing at the location of timing roller 21.

FIG. 28 is a flow chart showing a process for controlling the image interval and image end eraser 4 shown in FIG. 32. The process corresponds to step #190 of FIG. 20. The construction of the eraser 4 has already been described with reference to AIDC.

For the control process, a memory (ROM or the like) has stored therein a "magnification table" giving magnifications and corresponding numbers of LED's to be turned on and included in each image end (side) erasing group 4*a* or 4*c*, and a "size table" giving copy paper sizes and corresponding numbers of LED's to be turned on and included in each side erasing group 4*a* or 4*c*. First in steps #1901 to #1904, data as to the magnification actually selected or set and the copy paper size data detected are compared with these tables, and the corresponding items of data as to the "number of side erasing LED's to be turned on" are temporarily stored in registers individually. Tables 2 and 3 show examples of the "magnification table" and the "size table".

TABLE 2

Magnification table

| Magnification | Number of LED's to be on |
|---|---|
| 0.640–0.659 | 10 |
| 0.660–0.697 | 9 |
| 0.698–0.734 | 8 |
| 0.735–0.772 | 7 |
| 0.773–0.810 | 6 |
| 0.811–0.847 | 5 |
| 0.848–0.885 | 4 |
| 0.886–0.923 | 3 |
| 0.924–0.961 | 2 |
| 0.962–0.998 | 1 |
| 0.999–1.420 | 0 |

TABLE 3

Size table

| Paper size | Number of LED's to be on |
|---|---|
| A6 vertical | 10 |
| B6 vertical | 10 |
| A5 vertical | 10 |
| B5 vertical | 10 |
| A4 vertical | 9 |
| B4 vertical | 5 |
| A3 vertical | 1 |
| A5 horizontal | 8 |
| B5 horizontal | 5 |
| A4 horizontal | 1 |

Table 2 means that when copying operation is conducted at each magnification, an area having a width (width of each of opposite ends) included in the effective width of the drum 1 and corresponding to the region of erasing by the listed number of LED's concerned is erased before exposure. Table 3 means that the difference between the effective width of the drum 1 and each paper size (width) corresponds to the region of erasing by the listed number of LED's concerned. Each number of LED's listed is the number obtained by counting LED's from the left end of the side erasing portion 4*a* or from the right end of the portion 4*c*.

Subsequently, a switch SW61 (see FIG. 1) for detecting whether the unillustrated document cover is open, or the switch SW1 for detecting whether the DF unit 202 is open is checked in step #1905. If the cover or unit is closed, the data relating to the number of side erasing LED's and selected from the magnification table is transferred to C register for storing side erasing LED control data. On the other hand, if the cover or DF unit 202 is open, step #1907 compares A register (magnification table data) with B register (size table data), and the larger numerical value is selected as the number of side erasing LED's to be turned on. This data is fed to C register. Published Unexamined Japanese Patent Application SHO No. 57-102667, for example, discloses in detail that the mode of side erasing is changed depending on whether the document cover is open or closed.

In this case, one additional LED is turned on at each side in step #1910, and the result is further stored in C register, in order to eliminate the black frame to be produced on copy paper more reliably with consideration given to the possible slight displacement or the like of the document, whereby charges corresponding to one LED can be additionally removed by side erasing to avoid occurrence of black frame effectively. Furthermore, image inerval erasing can be initiated with earlier timing and completed with delayed timing in step #1911 to prevent occurrence of a black frame at the front and rear portions of images. Alternatively the same control effect can be achieved by charging the drum with delayed initiation timing and earlier completion timing. In either case, the timings are altered approximately by an amount corresponding to the erasing area to be covered by one LED.

The foregoing systems or mechanisms, control modes, relationships between the CPU's for executing control, etc. have been described in detail only by way of example to illustrate how to control the copying machine 100, the ADF 200 and the paper feed unit 400 as associated with one another, are therefore in no way limitative and can be modified variously within the technical scope of the invention.

In a copying machine or the like having the function of autoresetting operating conditions for the machine to standard conditions upon lapse of a specified period time after the completion of operation of the machine or after a predetermined input procedure, the present invention provides a control apparatus which, as already described, is characterized in that the apparatus comprises a key device associated with the main body of the machine for permitting the operation of the machine, sensor means for detecting whether the machine operation is permitted by the key device, and control means for effecting the autoresetting function to immediately reset the operating conditions to the standard conditions when the sensor means detects that the machine has been brought out of the operation permitted state by the key device, irrespective of lapse of the specified period of time for the autoresetting. Accordingly when having no intention to continue the operation of the machine, the user withdraws a key counter or the like, whereupon the operating conditions change to the standard conditions, thereby efficiently preventing the objection that the machine will subsequently operate under the conditions undesired by the user.

Although autoresetting of the copying machine 100 has been described according to the present embodiment, the control apparatus of the present invention is similarly usable for printers, facsimile systems and like machines.

What is claimed is:

1. A control apparatus for copying machines or the like comprising:

means for permitting a user to vary the operating conditions of the machine from a set of predetermined standard operating conditions;

means for resetting operating conditions for the machine automatically to standard conditions upon lapse of a specified period of time after the completion of an operation of the machine or after a predetermined input procedure by the user, a key device associated with the machine for permitting the operation of the machine, means for detecting whether the machine operation is permitted by the key device, and means for effecting the autoresetting function to reset the operating conditions to the standard conditions when the detecting means detects that the machine has been brought out of the operation permitted state by the key device, irrespective of any lapse of the specified period of time for the autoresetting.

2. A control apparatus as claimed in claim 1, wherein the key device is a key counter.

3. A control apparatus as claimed in claim 1, wherein the key device is a magnetic card.

4. A control apparatus for copying machines or the like that vary from predetermined standard operating conditions:

means for inputting operating conditions for the machine;

a key device associated with the machine for permitting the operation of the machine;

means for detecting whether a machine operation is permitted by the key device, and means for resetting the operating conditions to the predetermined standard conditions when said detecting means detects that the machine has been brought out of an operation permitted state by the key device.

5. A control apparatus as claimed in claim 4, wherein the key device is a key counter.

6. A control apparatus as claimed in claim 4, wherein the key device is a magnetic card.

7. A control apparatus for copying machines or the like comprising:

means for inputting variable operating conditions for the machine;

a key device attachable to and detachable from a predetermined position in relationship to the machine;

means for detecting the attachment and detachment of said key device from the predetermined position;

means for permitting the operation of the machine in accordance with the detection of an attachment of said key device, and means for inhibiting the operation of the machine and resetting the operating conditions to predetermined standard conditions in accordance with the detection of the detachment of said key device.

8. A control apparatus as claimed in claim 7, wherein the key device is a key counter.

9. A control apparatus as claimed in claim 7, wherein the key device is a magnetic card.

10. A control apparatus for copying machines or the like comprising:

means for setting variable operating conditions for the machine;

means for resetting operating conditions for the machine automatically to predetermined standard conditions upon lapse of a specified period of time after the completion of an operation of the machine or after a machine condition input procedure;

a key device attachable to and detachable from a predetermined position in relationship to the machine;

means for detecting the attachment and detachment of said key device to the predetermined position;

means for permitting the operation of the machine in accordance with the detection of an attachment of said key device, and means for inhibiting the operation of the machine and effecting said resetting function to reset the operating conditions to the standard conditions in response to the detection of the detachment of said key device, irrespective of the lapse of the specified period of time for the autoresetting.

11. A control apparatus for copying machines or the like comprising:

means for inputting operation conditions for the machine;

a card device insertable into a predetermined position of the machine;

means for detecting the presence and non-presence of said card device at the predetermined position;

means for permitting the operation of the machine in accordance with the detection of the presence of said card device by said detecting means, and means for inhibiting the operation of the machine and resetting the operation conditions set by said inputting means to predetermined standard conditions in accordance with the detection of the non-presence of said card device by said detecting means.

12. A control apparatus as claimed in claim 11, wherein the card device is a magnetic card.

* * * * *